United States Patent [19]

Scarpa

[11] Patent Number: 5,325,188
[45] Date of Patent: Jun. 28, 1994

[54] APPARATUS FOR NTSC SIGNAL INTERFERENCE CANCELLATION THROUGH THE USE OF DIGITAL RECURSIVE NOTCH FILTERS

[75] Inventor: Carl G. Scarpa, Edison, N.J.
[73] Assignee: Hitachi America, Ltd., Tarrytown, N.Y.
[21] Appl. No.: 3,714
[22] Filed: Jan. 13, 1993

Related U.S. Application Data

[63] Continuation-in-part of Ser. No. 882,851, May 14, 1992.
[51] Int. Cl.$^5$ .................. H04N 5/44; H04N 11/00; H04N 7/00
[52] U.S. Cl. .................. 348/624; 375/103; 455/307; 348/725; 348/736
[58] Field of Search .................. 358/36, 12, 167, 141, 358/142, 188, 38, 149, 196, 31; 455/296, 295, 307, 306, 305, 303; 375/103, 99, 101; 364/724.01, 724.17, 724.08; 328/166, 167; 333/176; H04N 5/21, 7/00, 11/00, 5/44

[56] References Cited

U.S. PATENT DOCUMENTS

| | | | |
|---|---|---|---|
| 3,744,015 | 7/1973 | Marimon et al. | 455/307 |
| 3,967,102 | 6/1976 | McCown | 364/724.19 |
| 4,199,660 | 4/1980 | Dill et al. | 370/50 |
| 4,480,236 | 10/1984 | Harris | 333/174 |
| 4,549,312 | 10/1985 | Michaels et al. | 455/311 |
| 4,589,083 | 5/1986 | LeDinh et al. | 364/724 |
| 4,667,225 | 5/1987 | Kanda | 358/36 |
| 4,673,982 | 6/1987 | Tam et al. | 358/167 |
| 4,954,785 | 9/1990 | Segaram | 328/167 |
| 5,031,194 | 7/1991 | Crespo et al. | 375/101 |
| 5,051,963 | 9/1991 | Linville, Jr. et al. | 364/724.01 |
| 5,086,340 | 2/1972 | Citta et al. | 358/141 |
| 5,087,975 | 2/1992 | Citta et al. | 358/188 |
| 5,121,208 | 6/1992 | Citta et al. | 358/167 |
| 5,157,697 | 10/1992 | Anauri et al. | 455/295 |
| 5,162,900 | 11/1992 | Citta | 358/167 |
| 5,222,106 | 6/1993 | Satoh et al. | 375/102 |
| 5,235,612 | 8/1993 | Stilwell et al. | 375/102 |
| 5,263,048 | 11/1993 | Wade | 375/99 |

OTHER PUBLICATIONS

McMann, R. H., et al., "A Digital Noise Reducer for Eucoded NTSC Signals", SMPTE Journal, Mar. 1978, vol. 87, No. 3, pp. 129–133.

E. P. Darbyshire, "Narrowband Interference Identification and Rejection Applied to Baseband Radio Signals", IEE Conference Publication No. 325. Published by IEE, Michael Faraday House, Stevenage, Engl., 1990, pp. 217–221.

General Instrument Corporation Videocipher Division, "Digicipher HDTV System Description", Aug. 22, 1991, pp. 31–40, 49–60.

Zenith, AT&T, "Technical Details, Digital Spectrum Compatible", Sep. 23, 1991, pp. 3–4, 51–56, 67–110.

David Sarnoff Research Center, Philips Laboratories, "Advanced Digital Television, System Description", Jan. 20, 1992, pp. v–vii, 69–113.

Advanced Television Research Consortium, "Advanced Digital Television, Prototype Hardware Description", Feb. 12, 1992, pp. 8–10, 45–57.

Daltorro, Jon, "The Implementation of Recursive Digital Filters for High–Fidelity Audio", J. Audio Eng. Soc., vol. 36, No. 11, Nov. 1988, pp. 851–877.

Primary Examiner—James J. Groody
Assistant Examiner—Safet Metjahic
Attorney, Agent, or Firm—Kenyon & Kenyon

[57] ABSTRACT

An NTSC interference canceler for eliminating NTSC signal interference from a HDTV signal uses recursive notch filters with adjustable center frequencies to isolate an NTSC signal's major components, i.e. the picture carrier signal, the chrominance subcarrier signal and the audio carrier signal. A single filter is used to isolate each NTSC interference signal component, with each particular filter's center frequency being adjusted to match the frequency of the particular NTSC interference signal component to be isolated by the filter. Each filter's gain may be either fixed or dynamically adjusted to match the amplitude of the NTSC interference signal component. Once isolated, these interference signal components are subtracted from the received television signal which includes both the NTSC interference signal and the HDTV signal. In this manner, the NTSC interference is removed from the HDTV signal.

19 Claims, 8 Drawing Sheets

BI-QUADRATIC FILTER AMPLITUDE/PHASE RESPONSE

APPARATUS FOR NTSC SIGNAL INTERFERENCE CANCELLATION THROUGH THE USE OF DIGITAL RECURSIVE NOTCH FILTERS

Related Application

This is a continuation-in-part of application Ser. No. 882,851, filed May 14, 1992.

FIELD OF THE INVENTION

The present invention is directed to signal interference cancelers and, more particularly, to an apparatus which uses a recursive filter to eliminate NTSC signal interference from television signals allowing for improved reception, referred to herein as high definition television ("HDTV") signals.

BACKGROUND OF THE INVENTION

Modern HDTV broadcasts will be required to coexist with the broadcast of NTSC (National Television Systems Committee) television broadcast signals presently in use. Since simulcasting will be used to accommodate HDTV broadcasts, an HDTV receiver will receive both an intended HDTV broadcast along with an unwanted NTSC broadcast. A problem of interference results from the presence of the NTSC broadcast being received, along with the HDTV broadcast signal.

NTSC interference caused by neighboring NTSC transmitters will be most severe at the fringe coverage area of the HDTV transmission region. At the fringe coverage area, the signal to noise ratio (SNR) of the HDTV broadcast will be at its lowest, with respect to the HDTV coverage area. Such a low SNR of the HDTV broadcast results in this fringe area since this is the broadcast region that is the greatest distance from the HDTV transmitter and, thus, it is an area which receives a relatively weak HDTV signal. Also, in the fringe coverage area the interfering NTSC signal will be at its largest, with respect to the coverage area of HDTV, since the distance to the NTSC transmitter increases and NTSC signal strength decreases, the further the NTSC broadcast signal travels away from the fringe area into the HDTV coverage area.

Thus, it is particularly in this fringe coverage area where NTSC broadcasts from neighboring broadcast regions will cause the most significant interference with an HDTV transmission.

Approaches to solve the problem of NTSC signal interference should effectively eliminate the NTSC interference without severely attenuating what may be an already weak HDTV signal.

One known approach to solving the NTSC signal interference problem is the use of a comb filter which has notches spaced apart by a fixed amount each notch having a fixed depth and width to eliminate NTSC interference. In accordance with this approach, the received signal is first demodulated down to the baseband signal and then filtered. Such an approach has several disadvantages. For instance, the use of a comb filter degrades the noise performance of the system by 3 decibels (dB). This loss in detection probability is due to the very wide notches that are placed at the location of the NTSC interference carrier and is also due, in part, to the fact that the comb filter also contains additional notches where no interference is located.

These additional notches cause the unnecessary attenuation of the HDTV signal in those areas where the additional notches are located, resulting in a reduced probability of signal detection.

Another known approach to resolving the problem of NTSC signal interference is to use an adaptive equalizer which forms notches which are then used to eliminate NTSC interference from the HDTV signal.

Such an approach has the disadvantage of being dependent on first demodulating the HDTV signal. In the fringe coverage area where NTSC interference is most severe, it may not be possible to demodulate the HDTV signal, making this filtering approach unavailable when NTSC signal attenuation is needed most.

Another known approach to the problem of NTSC signal interference uses spectral shaping of the HDTV signal to avoid all but the interference caused by the NTSC chrominance subcarrier. This approach fails to remove all of the NTSC signal interference from the HDTV signal and permits some of the chrominance subcarrier signal to remain causing interference with the HDTV signal. A further disadvantage of this approach is that it fails to make the most efficient usage of the available broadcast spectrum space.

In addition to the above approaches, forward error correction (FEC) encoding has also been used to combat NTSC signal interference. This approach, which attempts to correct errors resulting from NTSC signal interference, rather than to remove such interference from the received signal, has the drawback that it may not be possible to correct all the errors caused by the interference. Furthermore, the use of large amounts of FEC encoding fails, as with the case of spectral shaping to avoid NTSC signal interference, to make the most effective use of the available broadcast spectrum space.

All of the above known approaches have the drawback of failing to remove the NTSC signal interference prior to signal demodulation. These approaches have the disadvantage of first requiring the HDTV signal to be demodulated, something that may not be possible, before interference cancellation or error correction can occur.

SUMMARY OF THE INVENTION

The present invention provides apparatus for removing NTSC signal interference from high definition television signals through the use of recursive filters. In accordance with the present invention, an NTSC signal interference canceler is designed using recursive digital filters.

A tuner receives television broadcast signals which may include an NTSC interference signal in addition to a desired HDTV signal. These received television signals, including the NTSC interference signals, are converted from analog to digital signals through the use of an analog to digital (A/D) converter.

The signal which is output by the A/D converter may be supplied to the input of the NTSC signal interference canceler of the present invention. In this manner, the NTSC signal interference canceler of the present invention is supplied with a signal which includes both the desired HDTV signal and the undesired NTSC interference signal.

To eliminate the NTSC interference signal, while leaving the HDTV signal intact, in one exemplary embodiment of the present invention a first, a second and a third recursive filter are used to isolate a corresponding first, second and third one of the three major components of an NTSC broadcast signal, i.e. the picture carrier, chrominance subcarrier and audio carrier signals, respectively. These three major components of an NTSC broadcast signal are responsible for the majority of NTSC signal interference. In the above context, the phrase, "picture carrier", is used to refer to the luminance carrier component of an NTSC broadcast signal.

After each one of the interference canceler's first through third filters isolates the corresponding one of the NTSC signal's major components, the isolated NTSC component signals are subtracted from the received television signal by an adder. In this manner, the adder removes the NTSC signal interference from the received television signal and generates the HDTV output signal of the NTSC interference canceler of the present invention.

To provide for effective isolation of the NTSC signal components by the interference canceler's first, second and third filters, the signal interference canceler of the present invention uses recursive notch filters with adjustable center frequencies. The center frequency of each one of the first, second and third filters is adjusted to match the frequency of its corresponding NTSC interference signal component. In this manner, frequency inaccuracies in the tuner's output may be compensated for by adjustment of the center frequency of each one of the first, second and third filters of the interference canceler of the present invention. The recursive notch filters may also have either fixed or adjustable gains depending on the particular embodiment. While recursive notch filters with adjustable gains provide for a high degree of NTSC interference cancellation and signal recovery, fixed gain recursive filters, requiring less circuitry to implement than adjustable gain filters, may be used to provide a reduced level of NTSC cancellation.

In one embodiment of the present invention, the design of the interference canceler's first, second, and third filters is the same and thus, the filters are interchangeable with one another.

Each one of the first, second and third filters may comprise, e.g., a recursive filter circuit, a gain control circuit and a frequency control circuit. The recursive filter circuit of each interference canceler filter, has the received television signal including the NTSC interference signal, as an input signal.

Each recursive filter circuit, of the first, second and third interference canceler filters, places a notch at the center frequency of the corresponding NTSC interference signal component to be isolated. The center frequency of each notch is adjustable. Each recursive filter circuit may be implemented as a bi-quadratic recursive digital filter.

To insure cancellation of the NTSC interference signal at the interference canceler's adder, no phase shift should be induced onto the isolated NTSC signal component to be subtracted from the received television signal. In accordance with the present invention, at the center frequency of each recursive filter circuit's notch, the phase shift is approximately zero. However, phase shift will occur at frequencies other than the recursive filter's center frequency. Thus, to avoid phase shift, each recursive filter circuit should pass the NTSC signal component to be isolated at its center frequency.

In accordance with the present invention, the center frequency of each recursive filter circuit's notch is adjusted to pass the NTSC signal component to be isolated at the filter's center frequency. In one embodiment, a single frequency control circuit is used to adjust the center frequency of the first, second and third recursive filter circuits. In another embodiment, a separate frequency control circuit is used to independently control the center frequency of the notch produced by each of the first, second and third recursive filter circuits.

Thus, the NTSC signal interference canceler of the present invention accurately adjusts the placement of each one of the interference canceler's notches to correspond to the frequency of each one of the NTSC signal components. Accordingly, the apparatus of the present invention compensates for tuner and other frequency inaccuracies in the television signal.

In addition to adaptive adjustment of the center frequency of each of the first, second and third filters of the interference canceler, the gain of each one of the first, second or third filters may be independently adjusted to optimize NTSC signal interference cancellation. Alternatively, the gain of each one of the first, second, and third recursive filter circuits may be fixed at a value determined to be indicative of the anticipated NTSC energy distribution of the NTSC interference signal. In still yet other embodiments, various combinations of recursive filter circuits with fixed gains and recursive filter circuits with adjustable gains may be used to implement the NTSC canceler of the present invention.

In one embodiment of the present invention, the gain control circuit of each of the first, second, and third filters independently adjusts the gain of each filter as a function of an estimate of the power of the signal of interest, i.e. the HDTV signal, at the recursive filter's center frequency, $\omega_c$, and an estimate of the power of the signal of interest plus the power of the NTSC interference signal, at $\omega_c$. To estimate the power of the HDTV signal at $\omega_c$, a measurement of the received television signal's power is made at a frequency where the NTSC signal power is at a minimum. Since HDTV signal power is expected to be relatively constant throughout the HDTV signal's broadcast spectrum, this value may then be used as an estimate of the HDTV signal power at $\omega_c$ for purposes of calculating the gain of any one of the first, second or third filters.

Thus, in accordance with one embodiment of the present invention, the gain of each of the first, second and third filters is adjusted as a function of the estimated power levels to isolate the NTSC interference signal components, for subtraction from the received television signal, by the adder of the NTSC signal interference canceler of the present invention.

In such an embodiment, the independent adjustable gain of each one of the filters of the NTSC interference canceler of the present invention permits the gain of each filter to be adjusted so that the NTSC interference canceler of the present invention removes the NTSC interference signal while leaving the HDTV signal intact.

Since it is desirable to isolate only the NTSC interference signal components, for subtraction from the received television signal, the bandwidth of the first, second and third filters of the NTSC signal interference canceler of the present invention should be made sufficiently narrow to pass only the NTSC signal interference. However, if such narrow filters are not possible due to the numerical precision required to implement such filters, wider filter bandwidths may be used at the risk of attenuating some of the HDTV signal.

In one embodiment of the present invention, the bandwidth of the first, second and third filters, is made adjustable. In this embodiment each filter's bandwidth is initially set to be relatively wide to ensure that the major components of the NTSC signal fall within the passband of the corresponding first, second or third filter. Once the notch of each filter is centered at the frequency of the NTSC signal component to be isolated, the filter's bandwidth may be dynamically adjusted, by changing the value of alpha. Accordingly, the bandwidth of each filter may be narrowed by incrementing alpha towards the value of 1, narrowing the filter for optimal results. This permits the filter bandwidth to be adjusted in response to changes in the interference signal being received for optimal overall system performance and to insure that the HDTV signal is not unnecessarily attenuated as a result of excessive filter bandwidths.

While the use of three recursive notch filter circuits, i.e., one filter circuit being used to isolate each one of the three major components of an NTSC broadcast signal, provides a useful degree of NTSC interference cancellation, in one embodiment of the present invention additional recursive notch filters are used to remove NTSC signal components not removed by the three recursive notch filter circuits used to isolate the three major components of an NTSC broadcast signal. For example, in one embodiment, additional notch filters are centered about the picture carrier spaced approximately 15,734 Hz apart to isolate components of the NTSC picture carrier signal not isolated by the picture carrier filter circuit centered at the picture carrier's center frequency. By using such additional filters, improved NTSC signal cancellation and detection probability is achieved as compared to embodiments using fewer filters.

In order to reduce costs in particular applications, where only particular components of the NTSC signal are causing interference problems or are expected to cause interference problems, the apparatus of the present invention may be simplified to include recursive filters to remove only the NTSC signal components causing the interference problem and not all three of the NTSC signal's major components.

One particular advantage of the NTSC signal interference canceler of the present invention is that HDTV signal demodulation is not required for NTSC signal interference to occur. The received television signal is not demodulated prior to NTSC signal interference cancellation.

Thus, the apparatus of the present invention, unlike known approaches to solving the problem of NTSC signal interference, removes NTSC signal interference prior to HDTV signal demodulation. This increases the probability of signal detection even in cases where there is a relatively weak HDTV signal and a correspondingly low SNR, such as in the HDTV fringe coverage areas where NTSC signal interference poses the greatest problem.

Furthermore, the NTSC signal interference canceler of the present invention has the advantage of working with any of the currently proposed HDTV broadcast standards since the cancellation method used works in a manner that is independent of the type of HDTV signal involved.

DETAILED DESCRIPTION

Figure 1:
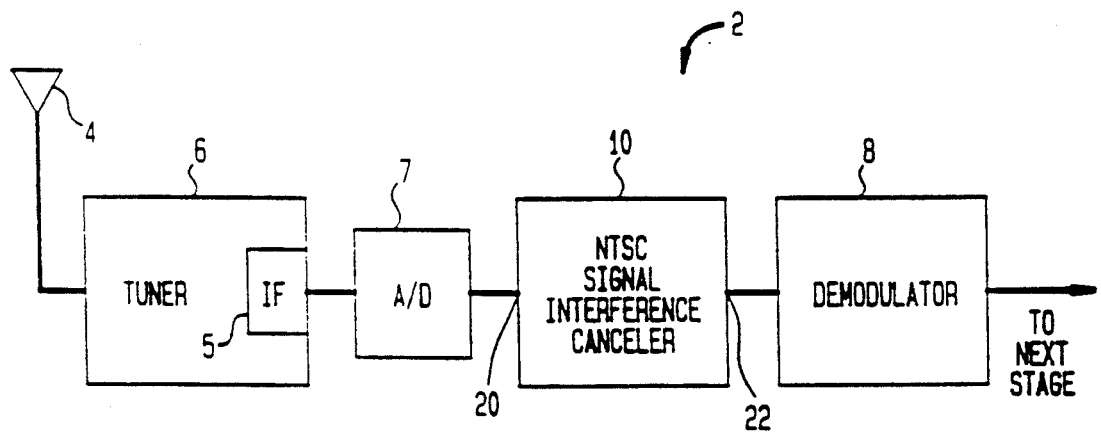
FIG. 1 is a schematic block diagram of an antenna through demodulator portion of a receiver, incorporating the NTSC signal canceler of the present invention.

Referring now to the drawings, and initially to FIG. 1, there is illustrated a television receiver according to the present invention, generally indicated by the reference numeral 2. The television receiver 2 comprises an antenna 4, a tuner 6, an analog to digital (A/D) converter 7, an NTSC signal interference canceler 10 and a demodulator 8.

The output of the antenna 4 is coupled to the input of the tuner 6. The tuner 6 may comprise, e.g., an intermediate frequency (IF) stage 5 which couples the signal input of the tuner 6 to a tuner output. The output of the tuner 6 is coupled to an input of the A/D converter 7. The output of the A/D converter is coupled to an input 20 of the NTSC signal interference canceler 10 of the present invention. In this manner, the NTSC signal canceler 10 is supplied with the received HDTV broadcast signal and the NTSC interference signal via the antenna 4, tuner 6 and A/D converter 7.

The interference canceler 10 of the present invention has an output 22 coupled to the demodulator 8. The demodulator 8, in turn, has a signal output for coupling to the next stage of the receiver's circuitry (not illustrated).

Figure 2:
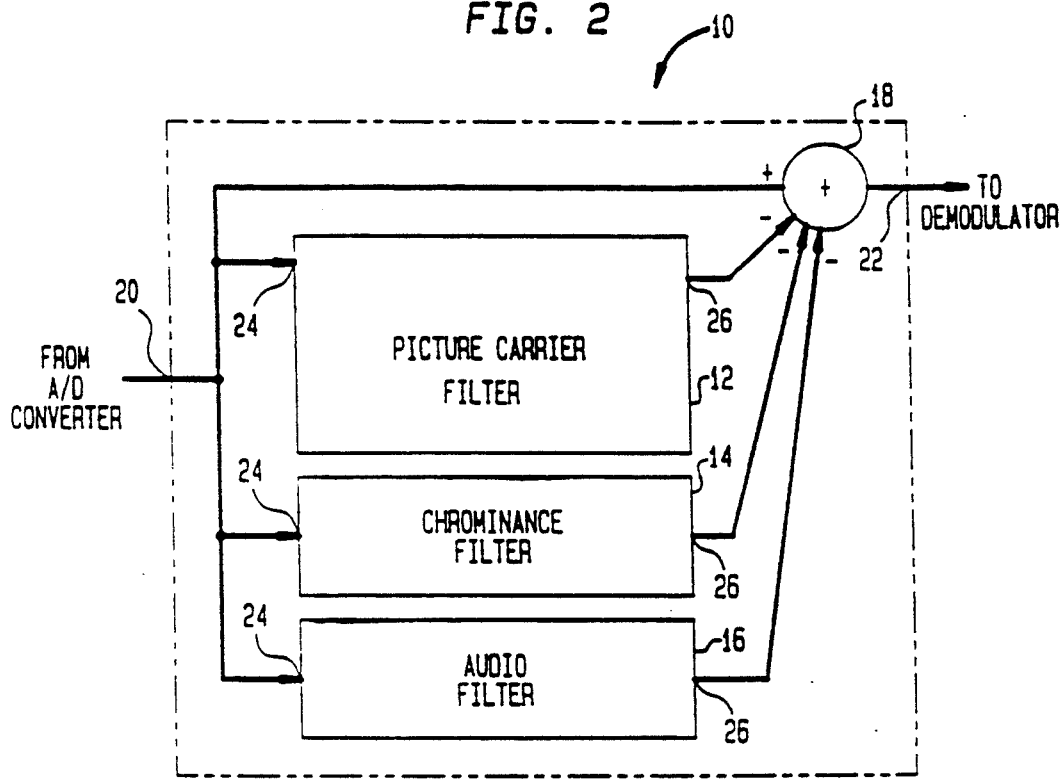
FIG. 2 is a block diagram of an NTSC signal interference canceler according to the present invention.

FIG. 2 illustrates a schematic block diagram of an exemplary embodiment of an NTSC signal interference canceler which may be used as the interference canceler 10, illustrated in FIG. 1.

The NTSC signal canceler 10 comprises a first, second and third filter 12, 14, 16 and an adder 18. The signal input 20 of the signal canceler 10 is coupled to a corresponding signal input 24 of each one of the first second and third filters 12, 14, 16 and to an adder input of the adder 18.

The first, second and third filters 12, 14, 16 each have a filter signal output 26. Each one of the filter signal outputs 26 is coupled to a corresponding one of a first, second and third subtractor input of the adder 18, respectively. The adder 18, in turn, has an HDTV signal output which is coupled to the corresponding HDTV signal output 22 of the NTSC signal interference canceler 10 of the present invention.

The first, second and third filters 12, 14, 16 may contain the same or similar filter circuitry and thus may be interchangeable. However, while the three filters 12, 14, 16 contain the same circuitry, each one of the filters 12, 14, 16 has a different gain and center frequency selected to correspond to the particular NTSC signal component the filter 12, 14, or 16 is designed to isolate.

Figure 6:
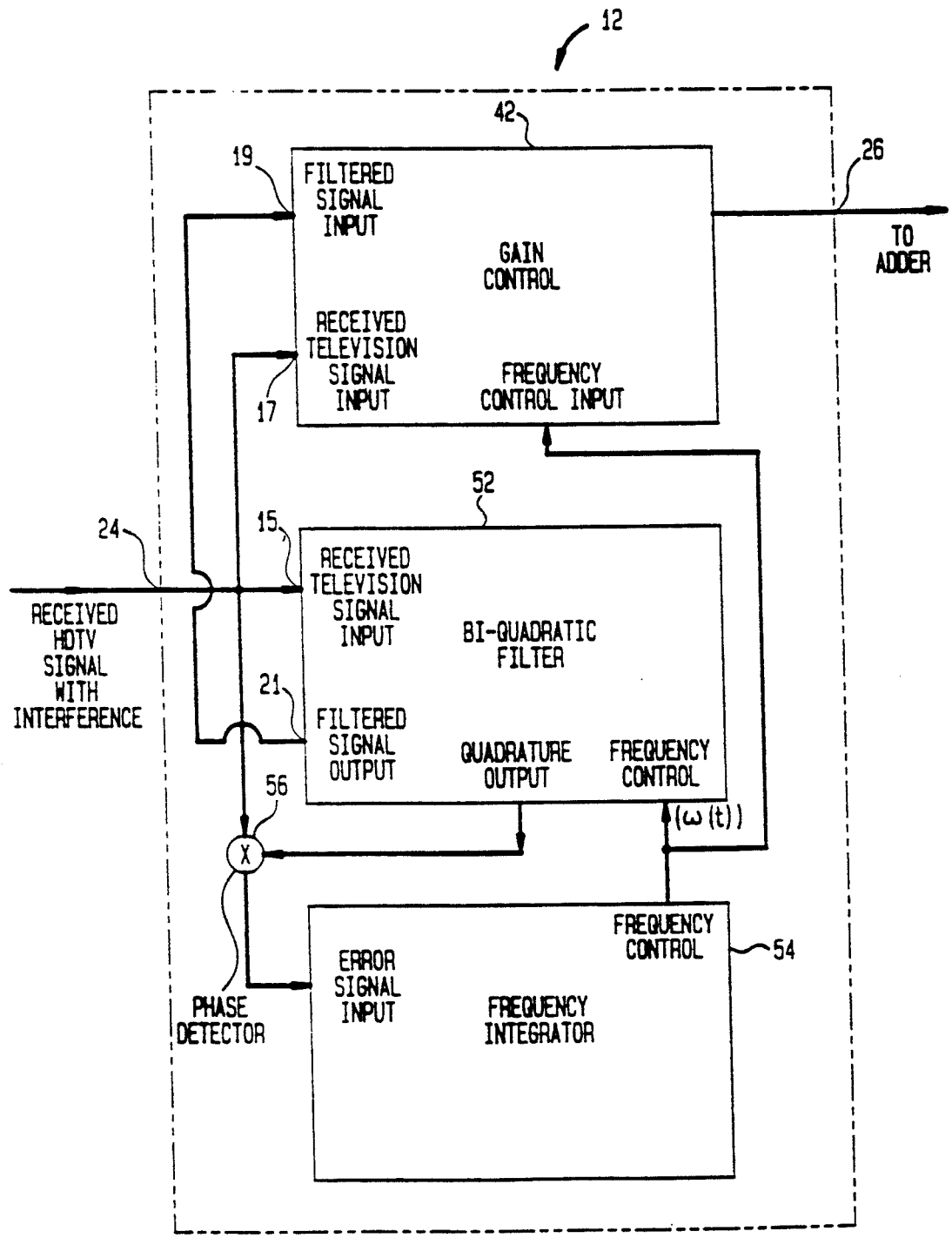
FIG. 6 is a block diagram of a circuit which may be used, in an exemplary embodiment of the present invention, as any one of the filters of the NTSC signal interference canceler illustrated in FIGS. 1 and 2.

Referring briefly to FIG. 6, in one embodiment of the NTSC interference canceler of the present invention, each one of the filters 12, 14, 16 comprises a gain control circuit 42, a recursive filter circuit 52 and a center frequency control circuit comprising a frequency integrator circuit 54 and phase detector 56. In various embodiments of the gain control circuit 42, the gain of each filter 12, 14, 16 may be dynamically adjusted or, alternatively, the gain control circuit 42 may comprise a fixed gain element with a gain that corresponds to the expected NTSC interference level. The gain control circuit 42 may also comprise a means for detecting the presence of NTSC interference and a means for disconnecting the filter when no interference is detected.

In accordance with one embodiment of the present invention, one or more of the filters 12, 14, 16 includes a frequency control circuit including a phase detector 56 and a frequency integrator 54 for adjusting the center frequency of the filters 12, 14, and/or 16. Accordingly, in the embodiment illustrated in FIG. 6, the filter 12 comprises a frequency control circuit for adjusting the center frequency of the individual filter 12.

Alternatively, because all NTSC signal components are frequency related, a single frequency control circuit may be used with all filters 12, 14, 16. When a single frequency control circuit is used, the center frequency of all the filters 12, 14, 16 are adjusted in unison. In accordance with such an embodiment, the frequency control circuit illustrated in FIG. 6 as part of the filter 12 may be used to control the center frequency of all the filters 12, 14, 16 avoiding the need for a frequency control circuit in the other filters 14 and 16. Since the signal to noise ratio is expected to be highest at the center frequency of the picture carrier component of the NTSC signal, it is desirable to include the frequency control circuit with the picture carrier filter 12 and have the center frequency of the other filters 14, 16 slave tuned to the frequency control circuit of the picture carrier filter 12.

Thus, the center frequency and/or gain of each one of the filters 12, 14, 16 can be adjusted to isolate a different component of the NTSC signal for enhanced overall NTSC signal cancellation.

The majority of NTSC signal interference will be caused by the NTSC signal's three major components, i.e., the picture carrier, chrominance subcarrier and audio carrier. Accordingly, each one of the NTSC signal interference canceler filters 12, 14, 16 are adjusted to isolate a different one of the NTSC signal's major components.

As shown in FIG. 2, the first filter 12 may be adjusted to isolate the NTSC picture carrier while the second and third filters 14, 16 may be adjusted to isolate the NTSC chrominance subcarrier and audio carrier, respectively. Once these signals are isolated, they may then be subtracted from the input signal by the adder 18.

In the above manner, the NTSC signal interference canceler 10 acts as a filter, placing an adjustable notch at each of the three NTSC major component's frequencies. Each one of these adjustable notches is generated by a different one of the three filters 12, 14, 16.

Figure 3:
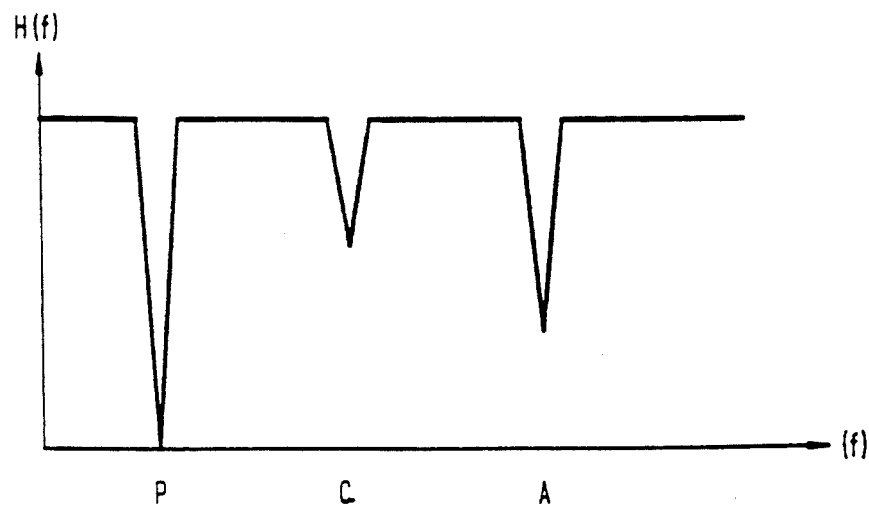
FIG. 3 illustrates the overall frequency response of the NTSC signal interference canceler of FIGS. 1 and 2.

A diagram of the overall transfer function, H(f), of the NTSC signal interference canceler 10 of the present invention is illustrated in FIG. 3. Referring now to FIG. 3, it can be seen that the interference canceler 10 places a notch at the carrier frequency (P, C, A) of each one of the picture carrier, chrominance subcarrier, and audio carrier components of an NTSC signal, respectively. In this manner, the interference from the NTSC signal is removed by the interference canceler 10 from the input signal. The gain of the filters 12, 14, 16 and thus the depth of each one of the notches illustrated in FIG. 3, is selected, in one embodiment, to be a fixed value corresponding to the anticipated power level of the interference signal. In another embodiment, the gain of one or more of the filters 12, 14, 16 is adjusted depending on the strength of the particular NTSC interference signal component to be isolated by the filters 12, 14, 16.

To enhance NTSC interference cancellation and signal recovery, the characteristics of the overall transfer function, H(f), associated with the interference canceler 10, illustrated in FIG. 3, should be optimized through the adjustment of the gain and center frequency of each one of the three filters 12, 14, 16, to provide the highest possible probability of detection of the HDTV signal.

According to detection probability theory, the highest probability of detection of a signal which contains noise is achieved when the signal is present in white noise and a matched filter is used. Thus, if the noise which is received with the desired HDTV signal is colored, e.g. by the presence of an NTSC signal, it should first be whitened by the use of a whitening filter before being supplied to the demodulator 8. It is possible to combine the function of the matched filter, modified to the whitened noise, into the whitening filter and arrive at what is referred to as a whitening-whitening conjugate filter.

Whitening-whitening conjugate filters attenuate the interference signal not to the noise level, but to a level as far below the HDTV plus noise level as the interferer's level was above the HDTV plus noise level. Such filters allow for a higher probability of signal detection. For this reason, one embodiment of the NTSC signal interference canceler 10 of the present invention is designed as a whitening-whitening conjugate filter.

To construct the interference canceler 10 as a whitening-whitening conjugate filter, each of the filters 12, 14, 16, are required to have a phase response that is zero at the frequency of the interference signal component to be removed.

Since tuner outputs have frequency uncertainties, the filters 12, 14, 16 of the present invention should be able to adapt in their center frequency. To reduce the cost and complexity of the filters 12, 14, 16 used in the interference canceler 10, the filters 12, 14, 16 are implemented using a recursive filtering technique which uses an infinite impulse response (IIR) filter.

Figure 4:
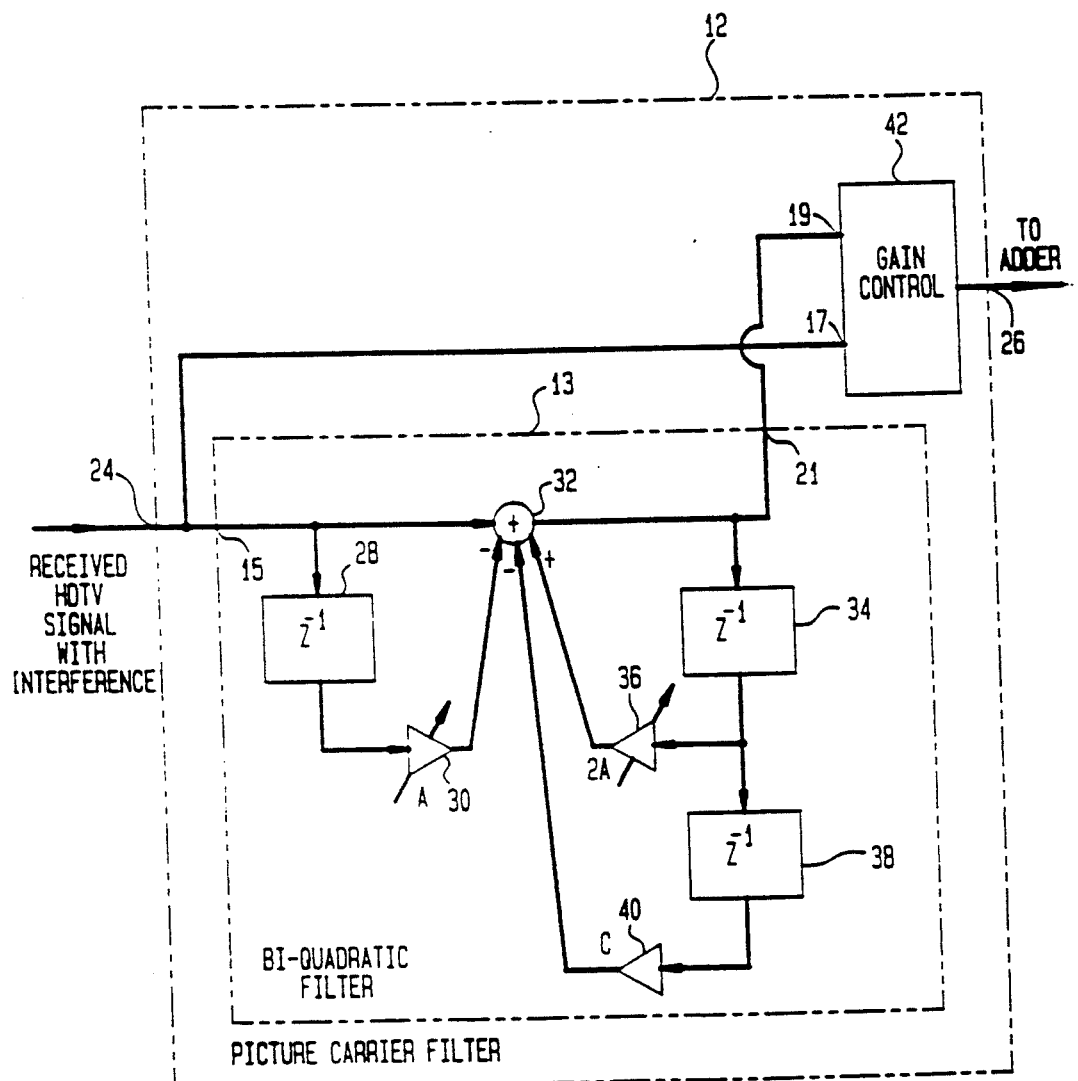
FIG. 4 is a block diagram of a filter circuit which may be used as any one of the filters of the NTSC signal interference canceler illustrated in FIGS. 1 and 2.

Referring now to FIG. 4, there is illustrated a simplified schematic block diagram of the picture carrier filter 12 with an adjustable gain element. The filter 12 comprises the hi-quadratic filter circuit 13 and the gain control circuit 42.

As noted above, all the filters 12, 14, 16 may contain identical circuitry. Thus, the circuit used to implement the filter 12 could be used to implement any one of the filters 12, 14, 16 of FIG. 2. A frequency control circuit may be added to the filter 12, as will be described below to adaptively adjust the center frequency of the filter 12.

The picture carrier filter 12 will only be explained since the other two filters 14, 16 are functionally identical.

The bi-quadratic filter circuit 13 comprises an adder 32, and first, second and third unit delay elements 28, 34, 38, respectively. The bi-quadratic filter circuit 13 further comprises first and second variable weight elements 30, 36 and a constant weight element 40.

The received television signal input 24 of the filter 12 is coupled to a received television signal input 15 of the bi-quadratic filter 13 and to a received television signal input 17 of the gain control circuit 42. Thus, both the gain control circuit 42 and the bi-quadratic filter 13 have the received television signal, which contains both the HDTV signal and the NTSC interference signal, as an input.

The received television signal input 15 of the bi-quadratic filter circuit 13 is coupled to a summing input of the adder 32 and to an input of the first unit delay element 28. The output of the first unit delay element 28 is coupled to the input of the first variable weight element 30 which, in turn, has its output coupled to a subtractor input of the adder 32.

The adder 32 has an output which is coupled to a filtered signal output 21 of the bi-quadratic filter 13 and to the input of the second unit delay element 34. The output of the second unit delay element 34 is coupled to the input of the second variable weight element 36 and to the input of the third unit delay element 38. The output of the second variable weight element 36 is coupled to a summing input of the adder 32.

The third unit delay element 38 has its output coupled to the input of the constant weight element 40 which, in turn, has its output coupled to a subtractor input of the adder 32.

The filtered signal output 21 of the bi-quadratic filter circuit 13 is coupled to the filtered signal input 19 of the gain control circuit 42. An NTSC interference signal output of the gain control circuit 42 is coupled to the output 26 of the filter 12. Thus, the amplitude of the NTSC interference signal, which is output by the filter 12 and which is to be subtracted from the received signal, is controlled by the weight, G, of the gain control circuit 42.

The weight elements 30, 36, 40 and the gain control circuit 42 have various weight or multiplier factors which can be represented by the symbols A, G and C. In the filter circuit 13, the first variable weight element 30 has a weight of A while the second variable weight element 36 has a weight of 2A, where A=alpha*cos($\omega$(t)) and where alpha is a real number.

The gain control circuit 42 has a weight of G, where G is used, as described above, to control the overall gain of the filter 12. The constant weight element 40 has a weight of C, where C=alpha * alpha.

The overall task of the filter 12, like the other filters 14, 16, is to place an adjustable notch, having an adjustable center frequency and/or gain, at the carrier frequency of the NTSC signal of interest, i.e., for this example, the picture carrier signal.

The filter circuit 13 and thus the filter 12 becomes a high Q resonant circuit at the center frequency $\omega_c$. The passband shape, i.e. the width of the filter notch, is controlled by alpha where alpha determines the distance from the unit circle at which the complex poles of the Z transform representation of the filter circuit 13 are placed. The center frequency of the filter circuit 13 is determined by the angular placement of the complex poles of the filter circuit 13. This is determined by the value of $\omega_c$ in radians/sample.

The center frequency of each filter notch is controlled by weights A and 2A and the depth of each notch by G. The output of the filter 12 must be in-phase with the input interference signal component if it is to cancel at the final output summing circuit, i.e. the adder 18. The weight G will control the amount of attenuation. This weight, G, may be adjusted based on the received television signal power level and the HDTV signal power level, as will be described below. Alternatively, a fixed weight G may be used to control the attenuation. When a fixed weight G is used, it is selected so that it approximates the expected energy level of the interfering NTSC signal component, i.e., the picture carrier signal in this example. When a fixed weight G is used, a connect/disconnect circuit is included in the gain control circuit 42 for disconnecting the filter when no NTSC interference is present.

The basic structure of the filter circuit 13, and thus the filter 12, is referred to as a bi-quadratic recursive digital filter. The difference equation for the filter circuit 13 is as follows:

$$y(n)=2A^*y(n-1)-C^*y(n-2)+x(n)-A^*x(n-1) \quad (1)$$

The Z transform of the transfer function of the filter 12 is:

$$\frac{Y(Z)}{X(Z)} = \frac{1 - AZ^{-1}}{1 - 2AZ^{-1} + CZ^{-2}}$$

if
A=alpha*cos($\omega$(t)) and,
C=alpha*alpha.

Figure 5:
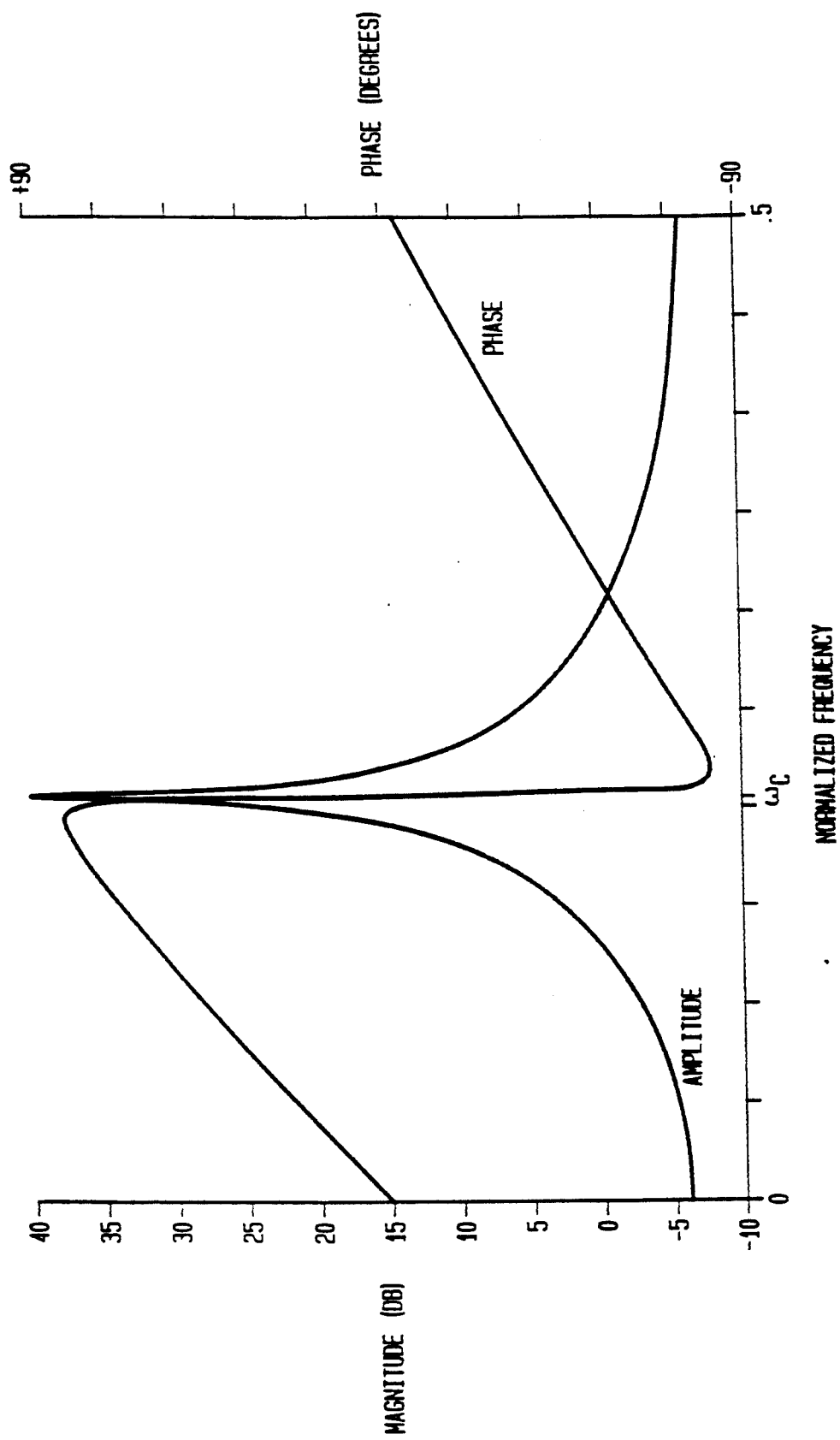
FIG. 5 is a diagram illustrating the amplitude and phase response characteristics of the filter illustrated in FIG. 4.

The amplitude and phase response of the filter circuit 13, and thus the filter 12, is shown in FIG. 5. The phase response at the filter's center frequency, $\omega_c$, is zero. This phase response is required to permit the coherent subtraction of the NTSC interference signal from the received television signal to leave the HDTV signal of interest. The overall gain of the filter 12 and hence the depth of the notch created by the filter 12 is determined by the gain, G.

Referring again to FIG. 3, the typical overall amplitude response of the NTSC signal interference canceler 10 is shown. Each one of the filters 12, 14, 16 is responsible for a corresponding one of the notches shown. The depths of each notch, controlled by each filter's individual gain, G, reflects the relative strength of each expected interfering NTSC signal component.

To insure cancellation of the NTSC interference signal, each filter 12, 14, 16 is required to pass each NTSC interference signal component at the filter's center frequency. This insures that no phase shift is induced onto the isolated NTSC interference signal component which is used for subtraction.

If the tuner's I. F. output has frequency inaccuracies, as is likely, the NTSC signal's components are not likely to fall at the expected frequency and thus may not fall in the center of each bi-quadratic filter 12, 14, 16.

This problem of frequency error, which may be caused by the tuner 6, is solved in the NTSC signal interference canceler 10 by adjusting each of the filter's 12, 14, 16 center frequencies, as will be described below. This is done by adjusting the weights used to control each filter's center frequency.

Referring now to FIG. 6, there is illustrated a schematic block diagram of a filter circuit 12 which may be used, in an exemplary embodiment of the present invention, as the picture carrier filter 12 of the NTSC signal interference canceler 10. The design of the filter 12 may be used to implement either of the other two filter circuits 14, 16 as well.

The filter circuit 12 of FIG. 6 comprises a gain control circuit 42, a bi-quadratic filter 52, and a frequency control circuit comprising the center frequency integrator circuit 54 and the phase detector 56.

The received television signal input 24 of the filter 12 is coupled to a received television signal input 15 of the bi-quadratic filter 52, a received television signal input 17 of the gain control circuit 42 and to a received television signal input of the phase detector 56. A quadrature component signal output of the bi-quadratic filter 52 is coupled to a quadrature component signal input of the phase detector 56.

The output of the phase detector 56 is, in turn, coupled to an error signal input of the frequency integrator 54. The frequency integrator 54 has a frequency control signal output coupled to a frequency control signal input of the bi-quadratic filter 52 and to a frequency control signal input of the gain control circuit 42.

A filtered signal output 21 of the bi-quadratic filter 52 is coupled to a filtered signal input 19 of the gain control circuit 42. The NTSC component signal output of the gain control circuit 42 is coupled to the output 26 of the filter 12.

Figure 7A:
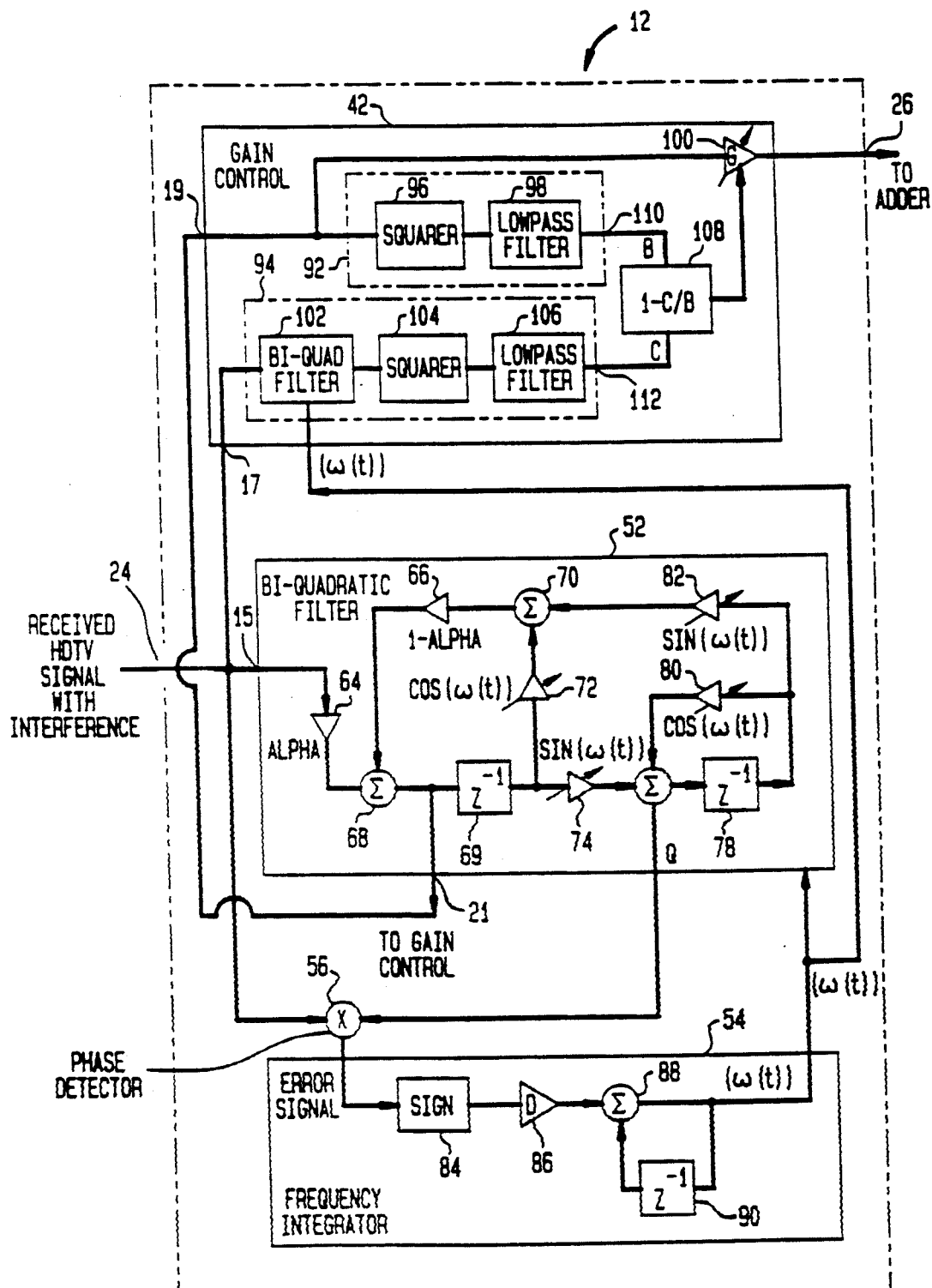
FIG. 7a is a more detailed schematic diagram of one embodiment of the circuit illustrated in FIG. 6 including an adjustable gain element.

Referring now to FIG. 7a, one embodiment of the filter 12 of FIG. 6, with an adjustable gain, is illustrated in greater detail. In FIG. 7a, like numbered elements as those contained in FIG. 6 are coupled together in the same manner as described above in regard to FIG. 6.

As illustrated in FIG. 7a, the bi-quadratic filter 52 comprises a first constant weight element 64 which has an input coupled to the received television signal input 15 of the bi-quadratic filter 52. The first constant weight element 64, which has a weight of alpha, has its output coupled to a first input of a first adder 68. The adder 68 has a second input which is coupled to the output of a second constant weight element 66, which has a weight of 1−alpha.

The adder 68 has an output coupled to a first unit delay element 69 and to the filtered signal output 21 of the bi-quadratic filter 52. The first unit delay element 69 in turn has its output coupled to the inputs of first and second variable weight elements 74, 72. The first variable weight element 74 has a weight of $\sin(\omega(t))$, while the second variable weight element 72 has a weight of $\cos(\omega(t))$.

The output of the first variable weight element 74 is coupled to a first input of a second adder 76. A second input of the second adder 76 is coupled to the output of a third variable weight element 80 which has a weight of $\cos(\omega(t))$.

The second adder 76 has a first and second output. The first output is coupled to the input of a second unit delay element 78. The second output of the second adder 76 is coupled to the quadrature component signal output of the bi-quadratic filter 52.

The second unit delay element 78 has its output coupled to an input of the third variable weight element 80 and to an input of a fourth variable weight element 82. The output of the fourth variable weight element 82, which has a weight of $\sin(\omega(t))$, is coupled to a first input of a third adder 70. The third adder 70 has a second input coupled to the output of the second variable weight element 72. An output of the third adder 70 is coupled to the input of the second constant weight element 66.

As described above, the output of the second constant weight element 66 is coupled to the second input of the adder 68 which generates the filtered signal output of the bi-quadratic filter 52.

Figure 7B:
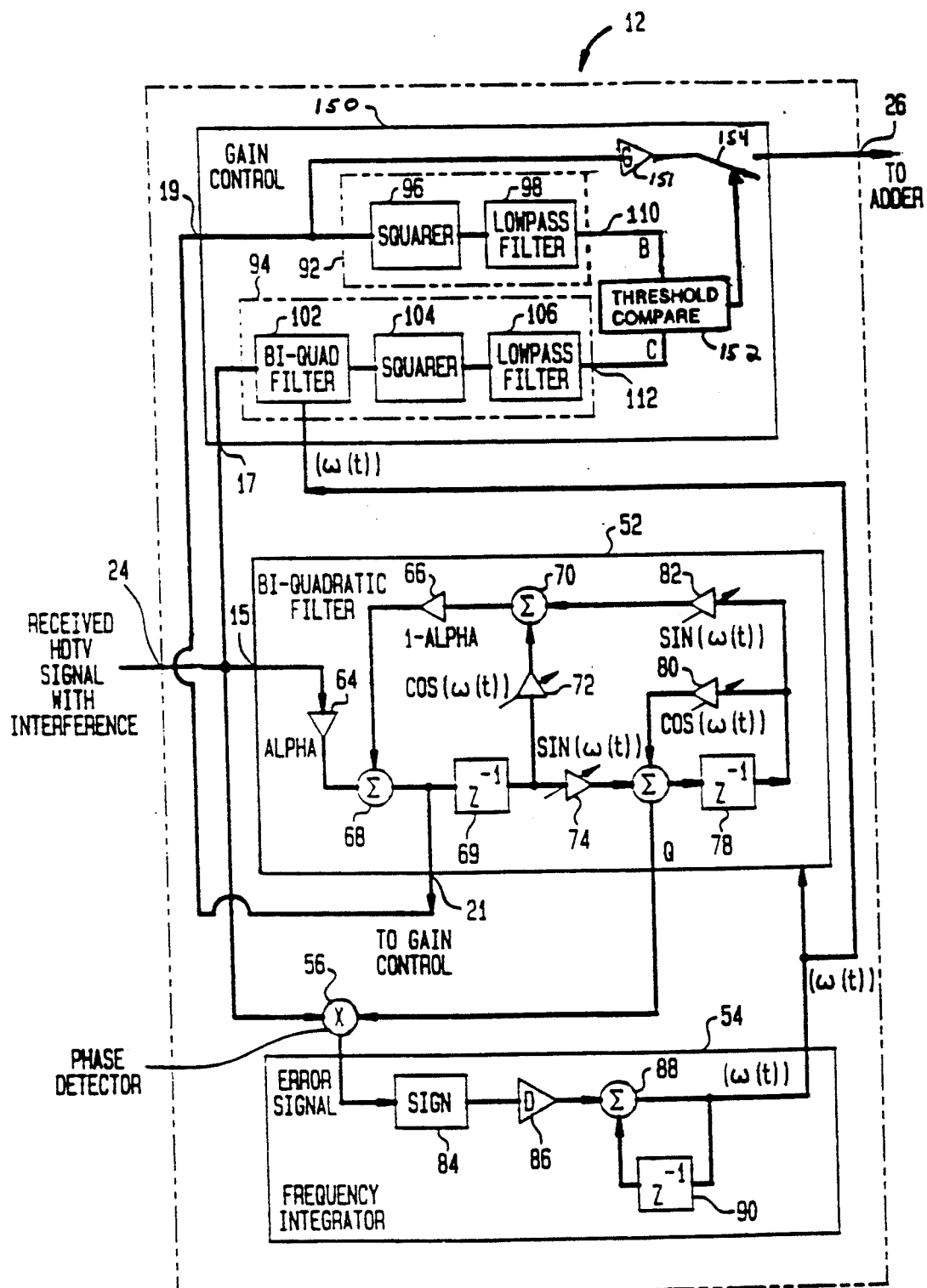
FIG. 7b is a more detailed schematic diagram of one embodiment of the circuit illustrated in FIG. 6 including a fixed gain element.
Figure 8:
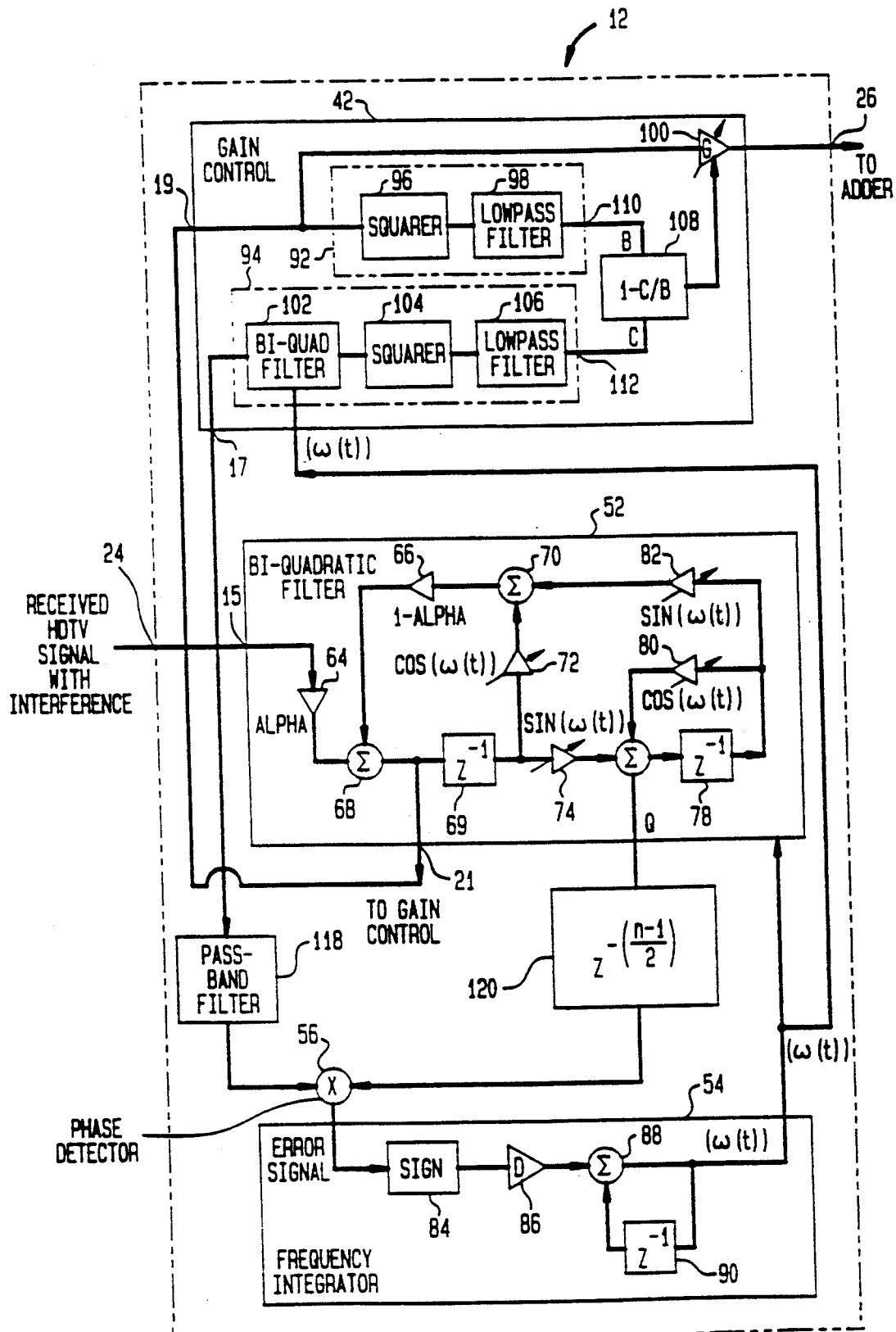
FIG. 8 is an alternative embodiment of a circuit which may serve as any one of the filters of the NTSC signal canceler of the present invention.

The bi-quadratic filter 52 of FIGS. 7a, 7b, and 8 are similar to the bi-quadratic filter 13, shown in FIG. 4, with the additional circuitry added to allow for a quadrature component signal output. The bi-quadratic filter 52 of FIGS. 6 and 7 and the bi-quadratic filter 13 of FIG. 4 have the same amplitude and phase response characteristics. The amplitude and response characteristics are illustrated in FIG. 5 for the bi-quadratic filter 13 of FIG. 4 with an alpha equal to 0.995 and for the bi-quadratic filter 52 of FIGS. 7, 8, and 9 with an alpha equal to 0.005.

The bi-quadratic filter 52 performs a transfer function between its input and its filtered signal output which has the following Z transform representation:

$$\frac{Y(Z)}{X(Z)} = \frac{A_n + B_n Z^{-1}}{A_d + B_d Z^{-1} + Z^{-2}}$$

where,
$A_n =$ alpha $/$ (1−alpha),
$B_n = -$ alpha $*$ cos $(\omega(t))$ $/$ (1−alpha),
$A_d = 1$ $/$ (1−alpha), and
$B_d = -(2-$alpha$) *$ cos $(\omega(t))$ $/$ (1−alpha)
and where alpha is a real number which controls the distance from the unit circle at which the complex poles of the Z transform representation of the filter circuit 52 are placed.

Initially, i.e., during the signal acquisition phase of filter operation, the center frequency of the bi-quadratic filter 52 is set to the expected frequency of the NTSC signal component to be isolated, e.g., the frequency of the picture carrier signal. The filter's center frequency is then adjusted, as will be described below, so that the filter's center frequency $\omega_c$ corresponds to the actual frequency of the NTSC signal component to be isolated.

For purposes of implementing the NTSC interference canceler 10, it is assumed that the tuner induced and other frequency inaccuracies will be small enough such that the major NTSC interference signal components will always fall within the passband of each filter 12, 14, 16. Such an assumption is reasonable given current tuner frequency inaccuracies and the expected bandwidth of the filters 12, 14, 16.

While the passband widths of the filters 12, 14, 16 can be made arbitrarily wide, unnecessarily wide passband widths have the drawback of possibly removing some of the HDTV signal along with the NTSC interference signal. For this reason, the passband width of the filters 12, 14, 16 should be made wide enough to remove the NTSC signal interference but narrow enough that no substantial attenuation of the HDTV signal occurs.

When the notch filters 12, 14, 16 are implemented using narrow passband widths, a portion of the NTSC interference signal may not be removed by the filters 12, 14, 16 because portions of the NTSC interference signal may fall outside the passband of the filters 12, 14, 16. In such a case, additional notch filters may be centered around the center frequency of the NTSC interference signal components at the component's sideband lines. For example, in one embodiment, a pair of notch filters is centered about the NTSC picture carrier signal component, spaced approximately 15.734 KHz apart so that the additional filters are located at the center of the sideband lines of the picture carrier signal. Each additional pair of notch filters centered about the picture carrier signal has been found to improve detection probability by approximately 1 dB. Thus, the use of such additional notch filters provides an effective means of improving the performance of the NTSC interference canceler 10 of the present invention.

The use of additional notch filters centered about the major NTSC interference signal components should improve the performance of the NTSC interference canceler 10 until the amount of inter-symbol interference caused by the notch filters is the dominant source of quadrature amplitude modulation ("QAM") signal distortion.

In accordance with the filter design illustrated in FIG. 7a, once an NTSC interference signal component is in the passband of the filter circuit 52, the output signal's frequency is the same as the input signal's frequency and the filter 12 only has to adjust its center frequency to achieve phase lock. This adjustment is the function of the phase detector 56 and the frequency integrator 54.

The frequency integrator 54, illustrated in FIG. 7a, comprises a sign detection block 84, a constant weight element 86 with a weight of B, an adder 88 and a unit delay element 90.

The output of the phase detector 56 is coupled to the error signal input of the frequency integrator 54. The error signal input of frequency integrator 54 is, in turn, coupled to the input of the sign detection block 84.

As illustrated in FIG. 5, the phase slope in the passband of the filter circuit 52 and thus the filter 12 is essentially linear. This feature of the filter circuit 52 is used by the phase detector 56 to generate an error signal which is used to control the center frequency of the bi-quadratic filter 52.

Standard phase lock techniques are used by the phase detector 56 to cross correlate the received television input signal with the quadrature component signal which is output by the bi-quadratic filter 52. At phase lock, the correlation of quadrature waveforms averages to zero. Any phase offset will result in a non-zero error signal being generated by the phase detector 56.

The integrator 54 receives and measures the error signal output by the phase detector 56. If the filter 52 is centered with the incoming NTSC waveform contained in the received television signal, the cross correlation of the input signal with the quadrature component signal is zero. If the filter circuit 52 is not centered, an error signal is generated and averaged by the integrator 54. The integrator's output is then used to adjust the filter's weight, ($\omega(t)$), such that the filter circuit 52, and thus the filter 12, centers itself about the frequency of the NTSC interference signal component which is to be isolated.

To allow for easy hardware implementation of the integrator 54, the sign of the error signal supplied to the integrator 54 is taken by the sign detector 84. The sign is then used to move the filter weights in a fixed step size up or down in frequency, depending on the sign of the error signal received. This step size, D, determined by the fixed weight of the constant weight element 86 illustrated in FIG. 7a, should be relatively small so that noise will not be able to move the center frequency of the filter circuit 52 in a large direction either up or down in frequency.

When the center frequency of the filter circuit 52 is not properly centered about the NTSC interference signal components frequency, the output of the sign detector 86 will hold mostly positive or negative, with fluctuations in the detected sign of the error signal being caused by the input television signal's noise component, including the received NTSC signal noise.

However, once phase lock has been achieved, and the center frequency of the filter circuit 52 matches the frequency of the NTSC interference signal component to be isolated, the output of the sign detector 84 will fluctuate equally in both the positive and negative directions. Such alternating fluctuations cannot coherently build a bias at the output of the adder 88 and thus the output of the integrator 54. Accordingly, once phase lock has been achieved, the center frequency of the filter circuit 52 and, thus, the center frequency of the filter 12 will remain fixed.

Similarly, if interference drop-out occurs, i.e. the NTSC interference signal is lost or fades for some reason, the center frequency of each filter 12, 14, 16, will not be changed. Without the NTSC interference signal, only random noise will remain. Such random noise cannot coherently build a bias on the integrator 54 because of the relatively even fluctuations in the output of the sign detector 84, caused by the random noise. Thus, during NTSC signal interference fades, the gain control circuit 42 will continue to adjust the gain of the filter 12; however, the center frequency will remain fixed as long as the NTSC signal fade lasts.

Since the center frequency of the filter 12 remains unchanged during interference signal fades, easy reacquisition of the NTSC interfering signal is possible after a signal fade ends. A fast lock-on time, e.g. a few dozen microseconds, is desirable, and is likely, since the NTSC interference signal should remain in the passband of the filter circuit 52 and thus the filter 12.

To achieve optimal cancellation of the NTSC interference signal, the gain of each of the filters 12, 14, 16 should be adjusted so that the output of the NTSC signal interference canceler 10 best approaches the true signal of interest ("SOI"), i.e. the HDTV signal. The gain control circuit 42 of FIG. 7a provides a gain control circuit for adjusting the gain G of the filter 12 based on the strength of the NTSC interference signal received.

For optimal cancellation of the NTSC interference signal by the interference canceler 10, the gain of each one of the filters 12, 14, 16 should equal unity minus the ratio of the SOI power level (i.e., without the NTSC interference signal) to the power level of the combined SOI and NTSC interference signal. Power levels are measured within the bandwidth of the measuring bi-quadratic filter. That is:

$$G_{opt} = 1 - \frac{P\_soi(\omega_c)}{P\_soi(\omega_c) + P\_carrier(\omega_c)} \quad (3)$$

where:

$P_{13}soi\,(\omega_c)$ = normal power of SOI at frequency $\omega_c$ and,
$P_{13}carrier(\omega_c)$ = power of interfering NTSC carrier signal at $\omega_c$.

Since it is not possible to measure only the power in the SOI at $\omega_c$, which serves as the numerator of equation (3), because the received television signal, at $\omega_c$, also contains the NTSC interference carrier signal, an approximation must be made in order to adjust the gain of the filter 12. Since the power density spectra of the modulation signals for the modulation schemes proposed to be used for HDTV signal transmission are relatively constant, an estimation of $P_{13SOI}(\omega_c)$ may be made by taking the power measurement at a frequency adjacent to $\omega_c$ where NTSC interference is minimal.

Accordingly, the adjacent frequency must be picked such that it does not fall on a sideband line of the NTSC interference signal, i.e. so that it falls in between the NTSC signal center frequencies. To measure the denominator of equation (3), shown above, which represents the power of both the HDTV signal and NTSC interference signal at $\omega_c$, the output of the bi-quadratic filter 52 is used by the gain control circuit 42. Once centered, the output of the bi-quadratic filter 52 contains both the SOI, i.e. the HDTV signal, and the interfering NTSC signal at $\omega_c$.

The gain control circuit 42, illustrated in FIG. 7a, measures the estimated power of the SOI at $\omega_c$, i.e. the HDTV signal at $\omega_c$, and the power of the SOI plus the power of the NTSC interference signal at $\omega_c$. These signal power measurements are then used to perform a calculation of the optimal gain, G, for the filter 12 in accordance with equation (3) above. The calculated gain G is used to control the overall gain of the filter 12.

The gain control circuit 42, illustrated in FIG. 7a, comprises a variable weight element 100, a gain calculation logic block 108, a first power estimation circuit block 92 and a second power estimation circuit block 94.

The filtered signal input 19 of the gain control circuit 42 is coupled to a filtered signal input of the variable weight element 100 and to a filtered signal input of the first power estimation circuit block 92. An output 110 of the first power estimation circuit block 92 is coupled to a first input of the gain calculation logic block 108.

The first power estimation block 92 comprises a circuit for squaring the amplitude of an input signal, referred to as a squarer 96, and a low pass filter 98. The filtered signal input of the first power estimation circuit block 92 is coupled to an input of the squarer 96. An output of the squarer 96 is coupled to the input of the low pass filter 98 which, in turn, has an output coupled to the output 110 of the first power estimation circuit block 92.

The first power estimation circuit block 92 receives the filtered television signal, output by the bi-quadratic filter 52, as an input signal. This input signal is then squared by the squarer 96 and then low pass filtered by the filter 98, to average the signal's power. Since the amplitude of the NTSC signal can fluctuate, this power measurement should be done many times a second, at least at a rate equal to the frame rate of NTSC broadcasts. After averaging by the low pass filter 98, the value of the signal supplied to the signal output 110 of the first power estimation circuit block 92 approximates the power of the SOI, i.e. the HDTV signal, plus the power of the NTSC interference signal at $\omega_c$.

The estimated signal power of the combined HDTV signal of interest and the NTSC interference signal at $\omega_c$ is represented by the capital letter B. The estimated signal power B is supplied to the gain calculation logic block 108 which uses the estimated signal power B to calculate the optimal gain of the filter 12.

The second power estimation circuit block 94 has a received television signal input and a frequency control input. The received television signal input of the gain control circuit 42 is coupled to the received television signal input of the second power estimation circuit block 94. The frequency control input of the gain control circuit 42 is coupled to the frequency control input of the second power estimation circuit block 94.

The second power estimation circuit block 94 comprises a bi-quadratic filter 102, a squarer 104 and a low-pass filter 106. The received television signal input of the second power estimation circuit block 94 is coupled to a signal input of the bi-quadratic filter 102. A frequency control input of the bi-quadratic filter 102 is coupled to the frequency control input of the second power estimation circuit block 94.

The second power estimation circuit 94 approximates the SOI power, i.e. the HDTV signal power, at $\omega_c$. As described above, the HDTV signal power density spectrum is likely to be relatively constant across the frequency spectrum of the HDTV broadcast. The NTSC signal interference canceler 10 of the present invention uses this fact to estimate the HDTV signal power by measuring the power at a frequency adjacent to $\omega_c$ where NTSC signal interference is at a minimum and the HDTV signal is at a region in its passband.

Since NTSC broadcasts have sideband lines spaced about the picture carrier approximately 15.734 Khz apart, if the filter 102 can be made narrow enough to measure between the sideband lines one can measure the HDTV signal power level by having the gain control circuit's bi-quadratic filter 102 of the picture carrier filter 12 centered at 23.601 Khz (or any multiple of 15.734 Khz+15.734/2 Khz) below the NTSC picture carrier interference frequency. To achieve accurate tuning of the gain control circuit's bi-quadratic filter 102, the filter 102 is gang tuned to the bi-quadratic filter circuit 52 via the frequency control input of the bi-quadratic filter 102.

The gain control circuit's bi-quadratic filter 102 has the same transfer function as the hi-quadratic filter circuit 52. Thus, the gain control circuit's bi-quadratic filter 102 may be implemented using the same circuitry as the bi-quadratic filter 52. However, as described above, a frequency offset not used in the filter circuit 52 is used in the filter 102 to insure that the center frequency of the gain control circuit's bi-quadratic filter 102 is located at a center frequency where NTSC signal power is at a minimum.

An output of the gain control circuit's bi-quadratic filter 102 is coupled to the input of the squarer 104. The squarer 104, in turn, has its output coupled to the input of the low pass filter 106. The output of the low pass filter 106 is coupled to the output 112 of the second power estimation circuit block 94. An output of the second power estimation circuit block 94 is coupled to a second input of the gain calculation logic block 108.

The received television signal which is supplied to the second power estimation circuit block 94 is filtered by the bi-quadratic filter 102. The filtered signal, output by the gain control circuit's bi-quadratic filter 102, approximates the HDTV signal without the NTSC interference signal which is present in the output of the bi-quadratic filter 52.

The signal output by the gain control circuit's bi-quadratic filter 102 is squared by the squarer 104 and then low pass filtered by the filter 106. The filter 106 outputs a signal which approximates the power of the HDTV signal, i.e. the SOI. The approximated HDTV signal power, represented by the capital letter C is supplied to the gain calculation logic block 108 and is used in calculating the optimal gain of the filter 12, in accordance with equation (3) above.

As illustrated in FIG. 7a, a gain control output of the gain calculation logic block 108 is coupled to a gain control input of the variable weight element 100. In this manner, the gain control calculation logic block 108 can supply the variable weight element 100 with a signal G which represents the optimal gain of the filter 12, calculated by the gain calculation logic block 108.

The signal G is used to control the gain of the gain control circuit's variable weight element 100, and thus the overall gain of the filter 12.

An output of the variable weight element 100 is coupled to the NTSC signal output of the gain control circuit 42. The NTSC signal output of the gain control circuit 42 is, in turn, coupled to the NTSC signal output 26 of the picture carrier filter 12.

By adjusting the gain G in accordance with equation (3) above, the output of the picture carrier filter 12 is adjusted so that the output signal approximates the NTSC picture carrier interference signal. This signal, which is output by the picture carrier filter 12, may be subtracted by the adder 18 from the received television signal, which includes the NTSC picture carrier signal interference, leaving the desired HDTV signal at the output 22 of the NTSC signal interference canceler 10.

To implement the gain control circuits 42 of the chrominance filter 14 and audio filter 16, the frequency offset used by each one of the bi-quadratic filters 102 to adjust the filter's center frequency to an NTSC null point, i.e. a frequency where NTSC signal power will be at a minimum, will be different than the 23,601 Khz frequency offset used in the picture carrier filter 12.

To adjust the chrominance and audio filter gains, the estimate of SOI power, i.e. HDTV signal power, should be done at the NTSC null point located approximately 4.2 Mhz away from the picture carrier. This region is fairly close to the chrominance subcarrier and very close to the audio carrier. Since it is a NTSC null point, measurements at this frequency should contain only the HDTV signal power.

Since the power of the received HDTV signal is relatively constant across the frequency spectrum of the HDTV broadcast the S0I power level estimate at a single NTSC null point, e.g., the null point located approximately 4.2 MHz away from the picture carrier can be used for all filters 12, 14, 16. Thus, each one of the filters 12, 14, 16 need not independently determine the SOI power level in order to calculate the desired gain of each one of the individual filters 12, 14, 16 or to determine if NTSC signal interference is present. Thus, any one of the filters 12, 14, 16 may determine the HDTV signal's power level C in the manner described above. This estimated S0I power level C may then be supplied as an input signal to the second input of the gain calculation logic block 108 of each one of the other filter blocks 12, 14, 16. In this manner, the need for the second power estimation circuit block 94, may be eliminated in all but one of the filters 12, 14, 16 of the NTSC signal interference canceler 10.

While such an approach has the advantage of reducing the amount of circuitry required to implement the NTSC interference canceler of the present invention, it has the drawback of decreasing the accuracy of the gain control circuits' estimation of NTSC interference power. For example, when severe multipath interference exists and the phase and amplitude of the multipath signal causes a null to occur at the reference point 4.2 Mhz away from the frequency of the picture carrier signal, the measurement of the signal of interest power at the reference point may result in a relatively low SOI power estimate compared to the estimated power of the SOI plus the NTSC interference made at the center frequency of the NTSC interference signal component to be isolated.

Thus, by using a single power measurement point which may be some distance away from the power measurement point of the SOI plus NTSC interference, some inaccuracies in the estimation of the strength of the interference signal may result in an overly high estimate of the strength of the NTSC interference signal or a determination that NTSC signal interference is present when there is none. While power estimation inaccuracies due to multi-path distortion may cause the filter to be connected when no interference is present resulting in a decrease in the signal to noise ratio, this is not expected to significantly interfere with signal detection.

In accordance with the above approach, in one embodiment of the present invention, the output 112 of the second power estimation circuit block 94, of the picture carrier filter 12, is coupled to the second input of the gain calculation logic blocks 108 of the gain control circuits 42 of both the chrominance filter 14 and the audio filter 16.

In this embodiment of the present invention, the second power estimation block 94 of the picture carrier filter 12 supplies the gain calculation logic blocks 108 of all three filters 12, 14, 16 with the signal C which represents the estimated power of the HDTV signal at $\omega_c$. Thus, the need to implement a second power estimation circuit block 94, in the all but one of the filters 12, 14, 16 is eliminated.

By eliminating the need for two of the three second power estimation blocks 94, two fewer bi-quadratic filters 103, squarers 104 and lowpass filters 106 are required to implement the NTSC signal interference canceler 10 of the present invention. Thus, this embodiment of the present invention provides the opportunity for a meaningful cost savings due to the reduced number of parts required to implement the interference canceler 10, with possibly no substantial effect on the overall performance of the NTSC signal interference canceler 10.

Referring now to FIG. 7b, there is illustrated another embodiment of the picture carrier filter 12 of the NTSC canceler 10. In the embodiment illustrated in FIG. 7b, the filter 12 has a fixed gain and a circuit for disconnecting the filter when NTSC interference is not detected or is below a predetermined level. Elements in FIGS. 7a and 7b which are the same or similar are assigned the same reference numbers for convenience.

While the use of adaptive notch depths provide for optimal NTSC signal cancellation, filters 12, 14, 16 with fixed notch depths may be used to provide a useful degree of NTSC interference cancellation. Accordingly, in the embodiment illustrated in FIG. 7b, the variable gain element 100 of FIG. 7a is replaced in FIG. 7b with a fixed weight element 151. While fixed gains G may be selected to provide optimal signal cancellation, to simplify the hardware implementation of the fixed gain element 151, a fixed gain G which is a power of two may be used.

In one embodiment, the filters 12, 14, 16 were implemented in a simulation using notch filters with fixed gains which were a power of two. In addition, first and second luminance sideband filters were used to improve NTSC signal interference cancellation. Below is a table listing the filter used in one embodiment of the present invention, the gain, and the attenuation of the NTSC signal component resulting from the use of the particular fixed depth notch filter listed in the first column.

TABLE I

| NTSC Component About Which Notch Filter Is Centered | Fixed Gain Of The Filter | Attenuation Of The Interference Component (dB) |
|---|---|---|
| Audio | .96875 | ~28 |
| Chrominance | .96875 | ~28 |
| Picture Carrier | .96875 | ~28 |
| First Picture Carrier Sideband Pair | .875 | ~18 |
| Second Picture Carrier Sideband Pair | .75 | ~12 |

To avoid the undesirable effect of attenuating the signal of interest when little or no NTSC interference is present and fixed gain notch filters 12, 14, 16 are used, a method of disconnecting each filter 12, 14, 16 when there is little or no NTSC interference present is employed. Accordingly, in one embodiment, a means for detecting the presence of NTSC interference and disconnecting each filter 12, 14, 16 is provided.

Referring again to FIG. 7b, it can be seen that the representative filter 12 comprises a gain control circuit 150, which unlike the gain control circuit 42 of FIG. 7a, has a fixed gain G. The gain control circuit 150 comprises a first and second power estimation circuits 92 and 94, respectively, a threshold compare circuit 152, the fixed weight element 151 and a switch 154.

The first and second power estimation circuit blocks 92, 94 operate as described above in regard to FIG. 7a. The output of the first power estimation block 92 is coupled to a first input of the threshold compare circuit 152 while the output of the second power estimation circuit 94 is coupled to a second input of the threshold compare circuit 152. In this manner, the threshold compare circuit 152 receives the output signal B, which approximates the power of the SOI, i.e. the HDTV signal, plus the power of the NTSC interference signal at $\omega_c$, from the first power estimation circuit block 92 and the signal C, which approximates the power of the SOI, from the second power estimation circuit 94.

The threshold compare circuit compares the value of the received signals B and C to determine the amount of NTSC interference present. If the NTSC interference is determined to be sufficiently large that the use of the filter 12, with a fixed gain, will increase signal detection probability, the switch 154 is closed so that the interference signal isolated by the filter 12 will be subtracted from the received signal.

To determine the amount of NTSC interference present and whether the switch 154 should be closed, the threshold compare circuit 152 compares the estimated power of the SOI plus NTSC interference signal, B, to the estimated power of the SOI, C to generate a power ratio of B:C. The result of the compare operation, e.g., the power ratio, is indicative of the amount of NTSC interference present.

In the embodiment described above in Table I, simulations have shown that if the power ratio of B:C is greater than, or equal to, two to one, connection of the filters 12, 14, 16, will increase the probability of signal detection. However, if the power ratio of B:C is less than two to one connection of the filters 12, 14, 16 is undesirable and may lead to a decrease in the probability of signal detection. Accordingly, in the embodiment of Table I, the threshold compare circuit 152 outputs a signal to close the switch 154 whenever the power ratio of B:C is greater than or equal to, two to one, and to open the switch when the power ratio is less than two to one.

In one embodiment of the present invention, a single fixed gain filter 12, 14, or 16 includes a gain control circuit 150 with first and second power estimating circuit blocks 92, 94 and a threshold compare circuit 152. The output of the threshold compare circuit 152 is coupled to the switch 154 of each of the filters 12, 14, 16 to control the switches for connecting and disconnecting each of the filters 12, 14, 16. In this manner, the need for more than a single first power estimating circuit block 92 and a single second power estimating circuit block 94 is eliminated.

Referring now to FIG. 8, still another embodiment of the filter circuits of the present invention is shown. Components of the filter circuit 12 of FIG. 8, are the same or similar to the components of FIG. 7 and are, for convenience, numbered the same in both figures. As illustrated in FIG. 8, the filter circuit 12 may further comprise an odd length finite impulse response ("FIR") passband filter 118, having n taps where n is an odd number, and a delay element 120 having a delay of $(n-1)/2$.

The FIR passband filter 118 has an input coupled to the received television signal input 24 of the filter 12 and an output coupled to the received television signal input of the phase detector 56.

The passband filter 118 has a passband width wide enough to permit the NTSC signal component which is to be isolated, i.e., the picture carrier signal, to pass through but narrow enough to insure that the other major NTSC signal components are outside the passband of the filter 118.

The delay element 120 has an input coupled to the quadrature signal component output of the bi-quadratic filter 52 and an output coupled to the quadrature signal component input of the phase detector 56.

As described above, the delay element 120, which is used to compensate for the signal delay introduced by the filter 118, has a delay of $(n-1)/2$ where the number n corresponds to the number of taps present in the passband filter 118 and where n is an odd number.

By using the passband filter 118, major NTSC signal components other than the NTSC signal component to be isolated are filtered from the received television signal supplied to the phase detector 58. This facilitates centering of the notch of the filter 12 about the NTSC component signal of interest since the error signal output by the phase detector 56, which is used by the frequency integrator 54 to adjust the center frequency of the filter 12, will not be significantly influenced by major NTSC signal components other than the one which is to be isolated by the filter 12.

Accordingly, by using the passband filter 118 and the delay element 120, the time needed to match the center frequency of the filter 52, and thus the filter 12, to the frequency of the NTSC interference signal component to be isolated, may be decreased.

It is desirable to make all of the filters 12, 14, 16 of the NTSC signal interference canceler 10 narrow enough to avoid the possibility of removing some of the HDTV signal along with the NTSC interference signal. To achieve a satisfactorily narrow filter, it is expected that the numerical precision needed will be 16×16 multiplies with 24-32 bits of accumulation. If this numerical precision is not feasible, precision may be relaxed at the expense of wider filters.

The above numerical precision will result in a filter transfer function with alpha being equal to 0.995 in the case of the filter illustrated in FIG. 4 and an alpha equal to 0.005 in the case of the bi-quadratic filters 52 102 of FIGS. 7 and 8. As described above, the value of alpha controls the placement of the filter's poles from the unit circle and the bandwidth of the filter. As alpha increases towards 1, in the case of the filter 13 of FIG. 3, and as alpha decreases towards zero in the case of the filters 52, 102 illustrated in FIGS. 7 and 8, the filters 12, 14, 16 become narrower. For example, at a sampling rate of 20 million samples per second, use of an alpha with a magnitude equal to 0.995 in the case of the filter 13 of FIG. 3, and an alpha of 0.005 in the case of the filters 52, 102 of FIGS. 7 and 8, will produce a filter with a 16 Khz bandwidth at the 3 dB point.

In addition to providing circuitry for adjusting both the gain of the filters 12, 14, 16, and the center frequency of the filters 12, 14, 16, it is possible to implement a circuit which would automatically adjust the bandwidth of the filters 12, 14, 16, to an optimal width in order to remove the interference signal while minimizing the loss of the signal of interest, i.e. the HDTV signal. In particular, it is expected that for the optimal performance the width of the audio filter should be greater than the width of the chrominance or picture carrier filters of the NTSC signal canceler of the present invention.

While the NTSC signal canceler of the present invention has been described above in terms of using a plurality of recursive notch filters 12, 14, 16 arranged in parallel to isolate NTSC signal interference which is then subtracted from the received signal to remove NTSC signal interference, the NTSC canceler of the present invention may also be implemented using a plurality of recursive passband filters located in series with one another. In such an embodiment, each recursive passband filter used has a notch located at the center frequency of an NTSC interference signal component. Accordingly, each recursive passband filter passes the received signal while eliminating a portion of an NTSC interference signal component. Thus, by using a series of such filters, e.g., three filters, with notches located at the center frequency of the three major NTSC signal components, NTSC signal interference may be reduced or eliminated from the received signal in accordance with the present invention.

I claim:

1. A filter for removing NTSC interference from a television signal having a sampling frequency of f., the filter comprising:

a fixed gain recursive digital linear notch filter having within the frequency range of 0 to f./2 only a single notch centered at the carrier frequency of a preselected NTSC signal component of the television signal and adapted for coupling to a tuner for receiving the television signal, for isolating the preselected NTSC signal component from the received television signal and for outputting the isolated NTSC signal component; and a summing circuit adapted for coupling to the tuner and selectively coupled to the recursive digital linear notch filter for receiving the isolated NTSC signal component and for subtracting the isolated NTSC signal component from the television signal.

2. A filter for removing NTSC interference from a television signal, the filter comprising:

a fixed gain recursive digital notch filter having a notch centered at the carrier frequency of a preselected NTSC signal component of the television signal and adapted for coupling to a tuner for receiving the television signal, for isolating the preselected NTSC signal component from the received television signal and for outputting the preselected NTSC signal component, said fixed gain recursive digital notch filter including:

i) a fixed gain recursive digital filter circuit for producing the notch centered at the carrier frequency of the preselected NTSC signal component of the television signal for isolating the preselected NTSC signal component and a HDTV signal component by passing the television signal at the carrier frequency of the preselected NTSC signal component;

ii) a gain control circuit for controlling the gain of both the isolated NTSC signal component and the HDTV signal component to generate a signal approximating the preselected NTSC signal component, the gain control circuit including a fixed gain element having an input coupled to the recursive digital filter circuit and an output selectively coupled to an output of the recursive digital notch filter; and iii) a frequency control circuit adapted for coupling to the tuner and coupled to the recursive digital filter circuit for adjusting the center frequency of the notch to match the carrier frequency of the preselected NTSC signal component; and a summing circuit adapted for coupling to the tuner and coupled to the output of the recursive digital notch filter for receiving the isolated NTSC signal component and for subtracting the isolated NTSC signal component from the television signal.

3. The filter of claim 2, wherein the gain control circuit further comprises:

a switch for selectively coupling the output of the fixed gain element to an output of the recursive digital notch filter; and means for detecting the presence of NTSC signal interference and closing the switch when NTSC interference is detected.

4. The filter of claim 2, wherein the gain control circuit further comprises:

a switch for selectively coupling the output of the fixed gain element to an output of the recursive digital notch filter;

a first power estimation circuit coupled to the fixed gain recursive digital filter circuit for receiving both the isolated NTSC signal component and the isolated HDTV signal component and for estimating the power of the isolated NTSC signal plus the HDTV signal at the carrier frequency of the preselected NTSC signal component;

a second power estimation circuit adapted for coupling to the tuner for receiving the television signal and for estimating the power of the HDTV signal; and a threshold compare circuit coupled to the first and second power estimation circuits and the switch for generating a signal for opening and closing the switch as a function of a ratio of the estimated power of the isolated NTSC signal component plus the HDTV signal component to the estimated power of the HDTV signal component.

5. The filter of claim 4, wherein the threshold compare circuit generates a signal to close the switch when the ratio of the estimated power of the NTSC signal component plus HDTV signal component to the estimated power of the HDTV signal component is approximately equal to, or greater than, 2:1.

6. The filter of claim 4, wherein the frequency control circuit comprises:
   (i) a phase detector including a first input adapted for coupling to the tuner for receiving the television signal and a second input coupled to a quadrature signal output of the digital recursive filter circuit for cross correlating a quadrature signal received from the recursive digital filter circuit and the television signal to produce a frequency error signal; and
   (ii) a frequency integrator coupled to the phase detector and a frequency control input of the recursive digital filter circuit, the frequency integrator for generating a frequency control signal as a function of the received error signal to adjust the center frequency of the recursive digital filter circuit to the center frequency of the preselected NTSC signal component.

7. A system for removing NTSC interference from a television signal, the television signal having a sampling frequency of $f_.$, the television signal including a high definition television (HDTV) signal component and a plurality of NTSC signal components, the system comprising:

a plurality of fixed gain linear recursive digital notch filters with adjustable center frequencies adapted for coupling to a tuner for receiving the television signal, each of the plurality of recursive digital notch filters having within the frequency range of 0 to $f_./2$ only a single notch centered at a different carrier, subcarrier or sideband frequency of a different corresponding one of the NTSC signal components for isolating the different corresponding one of the NTSC signal components from the television signal; and a summing circuit selectively coupled to the plurality of fixed gain linear recursive digital notch filters, and adapted for coupling to the tuner for receiving the television signal and the isolated ones of the NTSC signal components, the summing circuit for subtracting the isolated ones of the NTSC signal components from the television signal.

8. The system of claim 7, wherein the plurality of fixed gain recursive digital notch filters comprises:
   a first fixed gain recursive digital notch filter for producing a first notch centered at a carrier frequency of a first NTSC signal component of the plurality of NTSC signal components;
   a second fixed gain recursive digital notch filter for producing a second notch centered at the carrier frequency of a second NTSC signal component of the plurality of NTSC signal components; and means for detecting the presence of the first NTSC signal component and for coupling the first fixed gain recursive digital notch filter to the summing circuit upon detection of the first NTSC signal component.

9. A system for removing NTSC interference from a television signal, the television signal including a high definition television (HDTV) signal component and a plurality of NTSC signal components, the system comprising:

a plurality of fixed gain recursive digital notch filters with adjustable center frequencies adapted for coupling to a tuner for receiving the television signal, said plurality of fixed gain recursive digital notch filters including:
   i) a first fixed gain recursive digital filter having:
      a) a first fixed gain recursive digital notch filter circuit for producing a first notch centered at the carrier frequency of the first NTSC signal component and for isolating a first NTSC signal component and a first HDTV signal component at the carrier frequency of the first NTSC signal component by passing the television signal at the carrier frequency of the first NTSC signal component; and
      b) a first gain control circuit comprising a fixed gain element including an input coupled to the first digital filter circuit and an output coupled to an output of the first fixed gain recursive digital notch filter, for receiving the isolated first NTSC signal component and the first isolated HDTV signal component and for controlling the gain of the received signal components to generate a signal approximating the first NTSC signal component; and
      c) a first frequency control circuit adapted for coupling to the tuner and coupled to the first gain control circuit for adjusting the center frequency of the notch produced by the first recursive digital filter circuit to the carrier frequency of the first NTSC signal component; and
   ii) a second fixed gain recursive digital notch filter having a second fixed gain recursive digital notch filter circuit for producing a second notch centered at the carrier frequency of the second NTSC signal component, the second recursive digital filter circuit for isolating the second NTSC signal component and a second HDTV signal component at the carrier frequency of the second NTSC signal component by passing the television signal at the carrier frequency of the second NTSC signal component; and a summing circuit coupled to the plurality of fixed gain recursive digital notch filters, and adapted for coupling to the tuner for receiving the television signal and the isolated first and second NTSC signal components, the summing circuit for subtracting the first and second NTSC signal components from the television signal.

10. The system of claim 9, wherein the first gain control circuit further comprises:
   a first switch coupled to the output of the first fixed gain element and the the output of the first fixed gain recursive digital filter; and
   means for detecting the presence of the first NTSC signal component and for closing the switch when the NTSC signal component is detected.

11. The system of claim 9, wherein the second fixed gain recursive digital notch filter comprises:
a second fixed gain recursive digital filter circuit for producing a second notch centered at the carrier frequency of the second NTSC signal component, the second recursive digital filter circuit for isolating the second NTSC signal component and a second HDTV signal component at the carrier frequency of the second NTSC signal component by passing the television signal at the carrier frequency of the second NTSC signal component; and
a second gain control circuit comprising a fixed gain element including an input coupled to the second fixed gain recursive digital filter circuit and an output coupled to an output of the second fixed gain recursive digital notch filter, the second gain control circuit for receiving the isolated second NTSC signal component and the second isolated HDTV signal component and for controlling the gain of the received signal components to generate a signal approximating the second NTSC signal component.

12. The system of claim 9, wherein the second fixed gain recursive digital notch filter further comprises:
means for adjusting the center frequency of the second notch to the frequency of the carrier frequency of the second NTSC signal component, said means coupled to a frequency control signal output of the first frequency control circuit.

13. The system of claim 10 wherein the first NTSC signal component is an NTSC picture carrier signal component and the second NTSC signal component is an NTSC chrominance signal component.

14. The system of claim 7, wherein the plurality of fixed gain linear recursive digital notch filters comprises:
a first fixed gain linear recursive digital notch filter having a notch centered at a carrier frequency of a picture carrier signal component of the plurality of NTSC signal components;
a second fixed gain linear recursive digital notch filter having a notch centered at a sideband frequency of the picture carrier signal component; and
a third fixed gain linear recursive digital notch filter having a notch centered at a carrier frequency of an audio carrier signal component of the plurality of NTSC signal components.

15. The system of claim 7, wherein the plurality of fixed gain linear recursive digital notch filters comprises:
a first fixed gain linear recursive digital notch filter having a notch centered at a carrier frequency of an NTSC picture carrier signal component of the plurality of NTSC signal components; and
a second fixed gain linear recursive digital notch filter having a notch centered at a sideband frequency of the NTSC picture carrier signal component.

16. A system for removing NTSC interference from a television signal, the television signal including a plurality of high definition television (HDTV) signal components and a plurality of NTSC signal components, the system comprising:
a tuner for receiving the television signal;
a first recursive digital passband notch filter coupled to the tuner, the first filter having a notch centered at a carrier frequency of a first NTSC signal component of the plurality of NTSC signal components, the first recursive digital passband notch filter comprising,
i) a first recursive digital passband notch filter circuit for producing the first notch with an adjustable center frequency and depth, for receiving the television signal, and for passing the NTSC signal components and HDTV signal components located outside the first notch,
ii) a first gain control circuit coupled to the first recursive digital passband notch filter circuit including means for estimating the power of the first NTSC signal component and means for adjusting the depth of the first notch to approximately match the power of the first NTSC signal component, and
iii) a first center frequency control circuit coupled to the first recursive digital passband notch filter for adjusting the center frequency of the first notch to the carrier frequency of the first NTSC signal component; and
a second recursive digital passband notch filter coupled in series to the first recursive digital passband notch filter having a second notch with an adjustable center frequency and depth, the second notch centered at a carrier frequency of a second NTSC signal component of the plurality of NTSC signal components, the second recursive digital passband notch filter comprising,
i) a second recursive digital passband notch filter circuit for producing the second notch, for receiving the television signal, and for passing the NTSC signal components and HDTV signal components located outside the second notch,
ii) a second gain control circuit coupled to the second recursive digital passband notch filter circuit including means for estimating the power of the second NTSC signal component and means for adjusting the depth of the second notch to approximately match the estimated power of the NTSC signal component, and
iii) a second center frequency control circuit coupled to the second recursive digital passband notch filter for adjusting the center frequency of the second notch to the carrier frequency of the second NTSC signal component.

17. A system for removing NTSC interference from a television signal, the television signal including a plurality of high definition television (HDTV) signal components and a plurality of NTSC signal components, the system comprising:
a tuner for receiving the television signal;
a first recursive digital passband notch filter coupled to the tuner having a first notch centered at a carrier frequency of a first NTSC signal component of the plurality of NTSC signal components, the first recursive digital passband notch filter comprising,
i) a first recursive digital passband notch filter circuit for producing the first notch with an adjustable center frequency, for receiving the television signal and for passing the NTSC signal components and HDTV signal components located outside the first notch,
ii) a first fixed gain element coupled to the first recursive digital passband notch filter circuit for controlling the gain of the first recursive digital passband notch filter circuit, and
iii) a first center frequency control circuit coupled to the first recursive digital passband notch filter circuit for adjusting the center frequency of the first notch to the carrier frequency of the first NTSC signal component; and a second recursive digital passband notch filter coupled in series to the output of the first recursive digital passband notch filter having a second notch with an adjustable center frequency centered at a carrier frequency of a second NTSC signal component of the plurality of NTSC signal components, the second recursive digital passband notch filter comprising, i) a second recursive digital passband notch filter circuit for producing the second notch, for receiving the television signal, and for passing the NTSC signal components and HDTV signal components located outside the second notch, ii) a second fixed gain element coupled to the second recursive digital passband notch filter circuit for controlling the gain of the second recursive digital passband notch filter circuit, and iii) a second center frequency control circuit coupled to the second recursive digital passband notch filter circuit for adjusting the center frequency of the second notch to the carrier frequency of the second NTSC signal component.

18. A system for removing NTSC interference from a television signal including a high definition television (HDTV) signal component and a plurality of NTSC signal components, the system comprising:

a tuner for receiving the television signal;

an adder including a plurality of inputs and an output, a first input of said adder coupled to the tuner for receiving said television signal from said tuner;

a first recursive digital filter having an input coupled to said tuner for receiving said television signal from said tuner, said first filter having an adjustable notch at the carrier frequency of a first NTSC signal component of said plurality of NTSC signal components for isolating said first signal component, said first recursive digital filter comprising, i) a first recursive digital filter circuit for generating a first notch at the carrier frequency of the first NTSC signal component, ii) a first gain control circuit coupled to the first recursive digital filter circuit for controlling the gain of the first digital filter circuit, and iii) a first frequency control circuit for adjusting the frequency of the first notch to the carrier frequency of the first NTSC signal component coupled to the first recursive digital filter circuit and the tuner; and a second recursive digital filter having an input coupled to said tuner for receiving said television signal from said tuner, said second recursive digital filter having an adjustable notch at the carrier frequency of a second NTSC signal component of said plurality of NTSC signal components for isolating said second signal component, said second recursive digital filter comprising, i) a second recursive digital filter circuit for generating a second notch at the carrier frequency of the second NTSC signal component, ii) a second gain control circuit coupled to the second recursive digital filter circuit for controlling the gain of the second digital filter circuit, and iii) means for adjusting the frequency of the second notch to the carrier frequency of the second NTSC signal component coupled to said first frequency control circuit as a function of a frequency control signal output by said first frequency control circuit.

19. A filter for removing NTSC interference from a television signal, the filter comprising:

a fixed gain recursive digital notch filter having a notch centered at the carrier frequency of a preselected NTSC signal component of the television signal and adapted for coupling to a tuner for receiving the television signal, for isolating the preselected NTSC signal component from the received television signal and for outputting the preselected NTSC signal component;

a summing circuit adapted for coupling to the tuner and selectively coupled to the recursive digital notch filter for receiving the isolated NTSC signal component and for subtracting the isolated NTSC signal component from the television signal; and means for detecting the presence of the preselected NTSC signal component and for selectively coupling the fixed gain recursive digital notch filter to the summing circuit when the presence of the preselected NTSC interference signal component is detected.

* * * * *

UNITED STATES PATENT AND TRADEMARK OFFICE
CERTIFICATE OF CORRECTION

PATENT NO. : 5,325,188
DATED : June 28, 1994
INVENTOR(S) : SCARPA, Carl G.

It is certified that error appears in the above-indentified patent and that said Letters Patent is hereby corrected as shown below:

In Column 14, line 64, change "$P_{13}$" to -- $P_-$ --;

In Column 14, line 65, change "$P_{13}$" to -- $P_-$ --;

In Column 15, line 7, change "$P_{13}$" to -- $P_-$ --;

In Column 16, line 41, change "hi-" to -- bi --;

In Column 17, line 35, change "23,601" to -- 23.601 --.

In Column 21, line 60, delete "having a sampling frequency of f.";

lines 62 and 63, change "a fixed gain recursive digital linear notch filter having within the frequency range of 0 to f./2 only a single" to -- a fixed gain linear recursive digital notch filter having a --

In Column 22, line 4, change "the recursive" to

-- the linear recursive --.

line 5, change "linear notch" to -- notch --.

UNITED STATES PATENT AND TRADEMARK OFFICE
CERTIFICATE OF CORRECTION

PATENT NO. : 5,325,188         Page 2 of 2
DATED     : June 28, 1994
INVENTOR(S) : SCARPA, Carl G.

It is certified that error appears in the above-indentified patent and that said Letters Patent is hereby corrected as shown below:

In Column 23, lines 35 and 36, change "television signal, the television signal having a sampling frequency of f., the" to -- television signal, the -- lines 45 and 46, change "notch filters having within the frequency range of 0 to f./2 only a single notch centered at a different" to -- notch filters having a notch centered at a different --.

Signed and Sealed this

Twenty-ninth Day of November, 1994

Attest:

BRUCE LEHMAN

Attesting Officer        Commissioner of Patents and Trademarks